(12) United States Patent
Lee et al.

(10) Patent No.: US 10,705,374 B2
(45) Date of Patent: Jul. 7, 2020

(54) OPTICAL MEMBER, DISPLAY DEVICE INCLUDING THE SAME, AND METHOD OF MANUFACTURING THE OPTICAL MEMBER

(71) Applicant: Samsung Display Co., Ltd., Yongin-si (KR)

(72) Inventors: Sang Won Lee, Seoul (KR); Seong Yong Hwang, Hwaseong-si (KR); Tae Gil Kang, Hwaseong-si (KR); Sung Hoon Kim, Seoul (KR); Eun Guk Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/877,290

(22) Filed: Jan. 22, 2018

(65) Prior Publication Data
US 2019/0011779 A1    Jan. 10, 2019

(30) Foreign Application Priority Data

Jul. 7, 2017 (KR) .................. 10-2017-0086501

(51) Int. Cl.
| | |
|---|---|
| *G02F 1/133* | (2006.01) |
| *G02F 1/13357* | (2006.01) |
| *G02F 1/01* | (2006.01) |
| *F21V 8/00* | (2006.01) |
| *G02F 1/35* | (2006.01) |

(52) U.S. Cl.
CPC ....... *G02F 1/133602* (2013.01); *G02B 6/003* (2013.01); *G02F 1/0107* (2013.01); *G02B 6/0036* (2013.01); *G02B 6/0038* (2013.01); *G02B 6/0061* (2013.01); *G02F 2001/3505* (2013.01)

(58) Field of Classification Search
CPC ......... G02F 1/133526; G02F 1/133504; G02F 1/133615; G02F 1/133308; G02B 6/0053
USPC ..................................... 349/57, 95
See application file for complete search history.

(56) References Cited

U.S. PATENT DOCUMENTS

| | | | | |
|---|---|---|---|---|
| 6,164,799 A | * | 12/2000 | Hirmer ............... | G02B 6/0048 362/330 |
| 2005/0270802 A1 | * | 12/2005 | Hsu .................... | G02B 6/0036 362/626 |
| 2014/0117335 A1 | | 5/2014 | Moon et al. | |

(Continued)

FOREIGN PATENT DOCUMENTS

| | | | | |
|---|---|---|---|---|
| JP | 2016181474 | * | 10/2016 | ......... G02F 1/13357 |
| KR | 10-2013-0070904 | | 6/2013 | |
| KR | 10-2013-0105215 | | 9/2013 | |

(Continued)

*Primary Examiner* — James A Dudek
(74) *Attorney, Agent, or Firm* — H.C. Park & Associates, PLC

(57) ABSTRACT

An optical member including a light guide plate, a low refractive layer disposed on an upper surface of the light guide plate and having a lower refractive index than the light guide plate, a wavelength conversion layer disposed on the low refractive layer, a passivation layer disposed on the wavelength conversion layer and covering a side surface of the wavelength conversion layer and a side surface of the low refractive layer, and an optical pattern formed on a lower surface of the light guide plate.

17 Claims, 19 Drawing Sheets

(56) References Cited

U.S. PATENT DOCUMENTS

2017/0123134 A1    5/2017  Moon et al.
2017/0168214 A1*   6/2017  Cheng .............. G02F 1/133504

FOREIGN PATENT DOCUMENTS

| KR | 10-2014-0006714 | 1/2014 |
| KR | 10-2014-0053607 | 5/2014 |
| KR | 10-2017-0051639 | 5/2017 |

* cited by examiner

OPTICAL MEMBER, DISPLAY DEVICE INCLUDING THE SAME, AND METHOD OF MANUFACTURING THE OPTICAL MEMBER

CROSS-REFERENCE TO RELATED APPLICATION

This application claims priority from and the benefit of Korean Patent Application No. 10-2017-0086501, filed on Jul. 7, 2017, which is hereby incorporated by reference for all purposes as if fully set forth herein.

BACKGROUND

Field

Exemplary embodiments relate to an optical member, a display device including the same, and a method of manufacturing an optical member.

Discussion of the Background

A liquid crystal display device receives light from a backlight assembly and displays an image. The backlight assembly includes a light source and a light guide plate. The light guide plate receives light from the light source and guides a light traveling direction toward a display panel. As the light source, a point light source such as LED is generally used. However, in the case of the point light source, light is diffused and emitted, so that the straightness of the light path in the light guide plate may become diminished. When the straightness of light in the light guide plate is diminished, the luminance of a light facing surface may be reduced.

In addition, research has recently been carried out regarding application of a wavelength conversion film to improve image quality, such as the color reproducibility of a liquid crystal display device. Generally, a blue light source is used as the light source, and the wavelength conversion film is disposed over the light guide plate to convert blue light into white light. The wavelength conversion film includes wavelength conversion particles. These wavelength conversion particles are protected by a barrier film because they are generally vulnerable to moisture. However, the barrier film is expensive, and may cause an increase in thickness. Further, a complicated assembly process may be required because the wavelength conversion film should be laminated on the light guide plate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an optical member having a light guide function having an excellent light path straightness characteristic and/or a wavelength conversion function.

Exemplary embodiments also provide a display device having a light guide function having an excellent light path straightness characteristic and/or a wavelength conversion function.

Exemplary embodiments also provide a method of manufacturing an optical member having a light guide function having an excellent light path straightness characteristic and/or a wavelength conversion function.

Additional aspects will be set forth in the description which follows, and, in part, will be apparent from the disclosure, or may be learned by practice of the inventive concepts.

An exemplary embodiment of the inventive concepts discloses an optical member including a light guide plate, a low refractive layer, a wavelength conversion layer, a passivation layer, and an optical pattern formed on a lower surface of the light guide plate. The low refractive layer is disposed on an upper surface of the light guide plate and has a lower refractive index than the light guide plate. The wavelength conversion layer is disposed on the low refractive layer. The passivation layer is disposed on the wavelength conversion layer and covers a side surface of the wavelength conversion layer and a side surface of the low refractive layer. The optical pattern is formed on a lower surface of the light guide plate.

An exemplary embodiment of the inventive concepts also discloses an optical member including a light guide plate and an optical pattern. The optical pattern is disposed on a lower surface of the light guide plate. The optical pattern includes a first pattern having a line shape extending in one direction and a second pattern having an uneven shape and formed on the first pattern. A side surface of the optical pattern is located inward from a side surface of the low refractive layer.

An exemplary embodiment of the inventive concepts also discloses an optical member including a light guide plate. The light guide plate includes an optical pattern integrally formed on a lower surface thereof. The optical pattern includes a first pattern having a line shape extending in one direction and a second pattern formed on the first pattern. A side surface of the optical pattern is located inward from a side surface of the light guide plate.

An exemplary embodiment of the inventive concepts also discloses a display device including a light guide plate, a low refractive layer, a wavelength conversion layer, a passivation layer, an optical member, a light source and a display panel. The low refractive layer is disposed on an upper surface of the light guide plate and has a lower refractive index than the light guide plate. The wavelength conversion layer is disposed on the low refractive layer. The passivation layer is disposed on the wavelength conversion layer and covers a side surface of the wavelength conversion layer and a side surface of the low refractive layer. The optical member includes an optical pattern disposed on a lower surface of the light guide pattern. The light source is disposed at one or more sides of the light guide plate. The display panel is disposed over the optical member.

An exemplary embodiment of the inventive concepts also discloses a method of manufacturing an optical member, including: preparing a light guide plate, forming a resin layer on one side of the light guide plate such that a side surface of the resin layer is located inward from a side surface of the light guide plate, and pressing the resin layer with a stamper to transfer a surface shape of the stamper. The stamper includes a first pattern having a line shape extending in one direction and a plurality of second patterns formed on the first pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
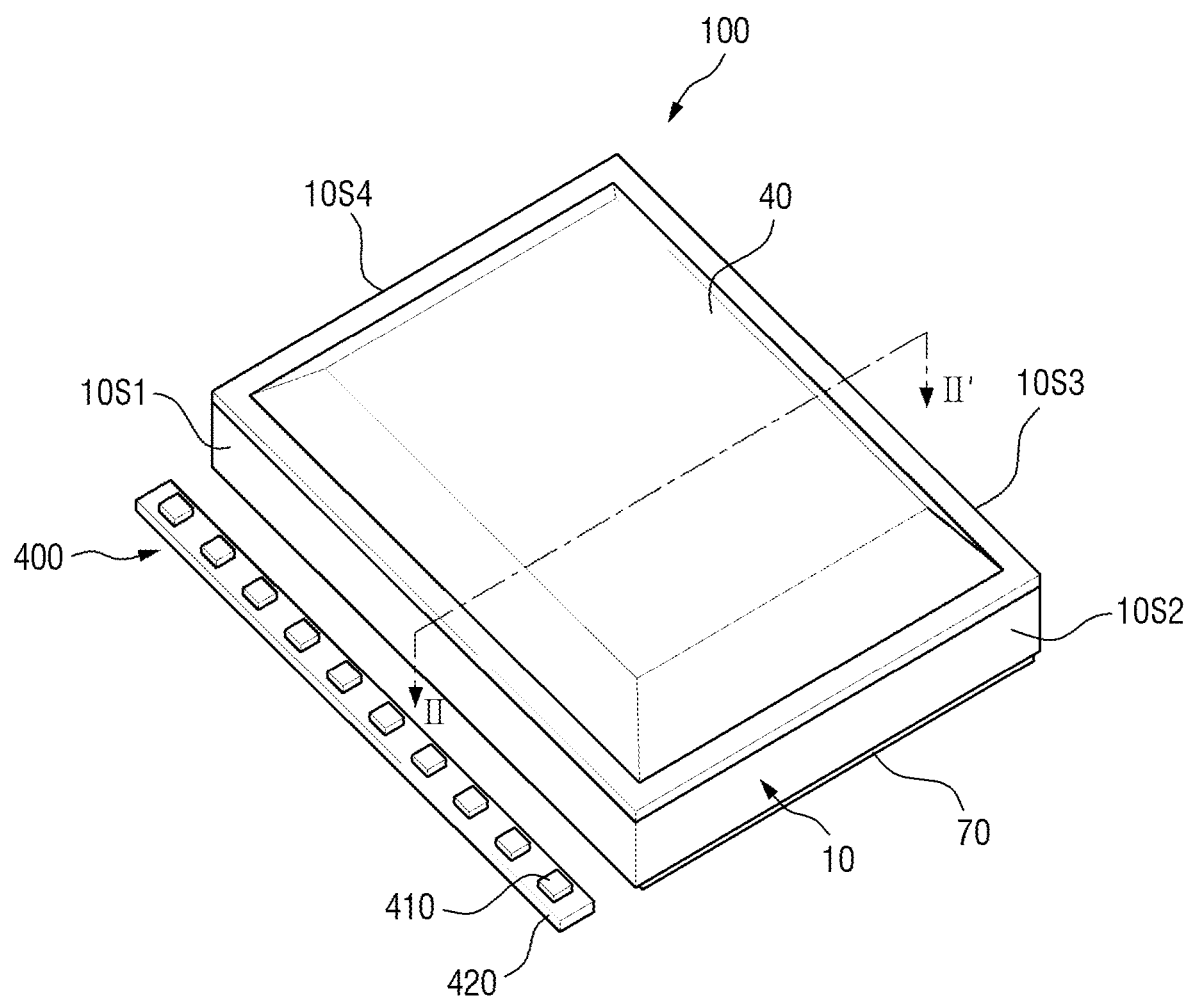
FIG. 1 is a perspective view of an optical member according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
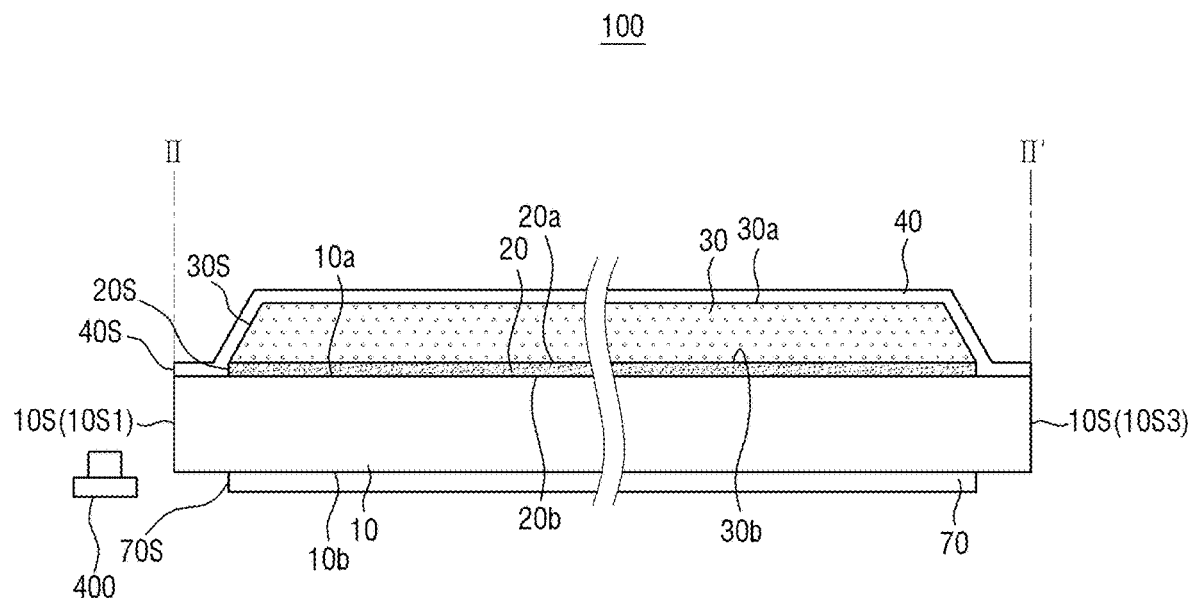
FIG. 2 is a sectional view taken along the line II-II' of FIG. 1.

FIG. 1 is a perspective view of an optical member according to an exemplary embodiment. FIG. 2 is a sectional view taken along the line II-II' of FIG. 1.

Referring to FIGS. 1 and 2, an optical member 100 includes a light guide plate 10, a low refractive layer 20 disposed on the upper surface 10a of the light guide plate 10, a wavelength conversion layer 30 disposed on the low refractive layer 20, a passivation layer 40 disposed on the wavelength conversion layer 30, and an optical pattern 70 disposed on the lower surface 10b of the light guide plate 10. The light guide plate 10, the low refractive index layer 20, the wavelength conversion layer 30, the passivation layer 40, and the optical pattern 70 may be integrally connected.

The function of the light guide plate 10 is to guide the traveling path of light. The light guide plate 10 may generally have a polygonal columnar shape. The planar shape of the light guide plate 10 may be rectangular, but is not limited thereto. In an exemplary embodiment, the light guide plate 10 may have a hexagonal columnar shape with a rectangular planar shape, and the hexagonal columnar shape may include an upper surface 10a, a lower surface 10b, and four side surfaces (10s: 10s1, 10s2, 10s3, and 10s4).

In an exemplary embodiment, each of the upper surface 10a and lower surface 10b of the light guide plate 10 is located on the same plane. The plane on which the upper surface 10a is located and the plane on which the lower surface 10b is located may be substantially parallel to each other, and thus the light guide plate 10 may have a uniform thickness as a whole. However, the inventive concepts are not limited thereto, and the upper surface 10a or the lower surface 10b may be formed of a plurality of planes, or the plane on which the upper surface 10a is located and the plane on which the lower surface 10b is located may intersect each other. For example, in a wedge-typed light guide plate 10, the thickness thereof may be reduced from one side surface (for example, light incidence surface) to the other side surface (for example, light facing surface) facing the one side surface. Further, in the vicinity of one side surface (for example, light incidence surface), the lower surface 10b is inclined upward toward the other side surface (for example, light facing surface) facing the one side surface to reduce the thickness thereof, and then the upper surface 10a and the lower surface 10b may be formed in a flat shape.

In an application example of the optical member 100, the light source 400 may be disposed adjacent to at least one side surface 10s of the light guide plate 10. FIG. 1 illustrates a case where a plurality of LED light sources 410 mounted on a printed circuit board 420 are disposed adjacent to one side surface 10s1 at which one long side of the light guide plate 10 is located, but the present invention is limited thereto. For example, the plurality of LED light sources 410 may be disposed adjacent to both long side surfaces 10s1 and 10s3, or may be disposed adjacent to one short side surface 10s2 or 10s4 or both short side surfaces 10s2 and 10s4. In the exemplary embodiment of FIG. 1, one long side surface 10s1 of the light guide plate 10 disposed adjacent to the light source 400 is a light incidence surface (marked as 10s1' for convenience of explanation in the drawings), and the other long side surface 10s3 facing the one long side surface is a light facing surface (marked as '10s3' for convenience of explanation in the drawings).

The light guide plate 10 may be made of an organic material or an inorganic material. For example, the light guide plate 10 may be made of an organic material such as PMMA (polymethyl methacrylate), PC, or PET, or an inorganic material such as glass, but the inventive concepts are not limited thereto.

The low refractive layer 20 is disposed on the upper surface 10a of the light guide plate 10. The low refractive layer 20 is interposed between the light guide plate 10 and the wavelength conversion layer 30 to assist in total reflection of the light guide plate 10. More specifically, in order for the light guide plate 10 to perform efficient light guide from the light incidence surface 10s1 to the light facing surface 10s3, effective total internal reflection is performed on the upper surface 10a and lower surface 10b of the light guide plate 10. One of the conditions under which total internal reflection can be performed in the light guide plate 10 is that the refractive index of the light guide plate 10 is greater than the refractive index of a medium forming an optical interface together with the light guide plate 10. As the refractive index of the medium forming the optical interface together with the light guide plate 10 becomes lower, a total reflection critical angle becomes smaller, so that more total internal reflections can be performed.

Explaining a case where the light guide plate 10 is made of glass having a refractive index of about 1.5, when the upper surface 10a of the light guide plate 10 is exposed to an air layer to form an interface therebetween, sufficient total reflection may be performed because the air layer generally has a refractive index of about 1. However, as shown in FIG. 2, when other optical functional layers are integrally laminated on the upper surface 10a of the light guide plate 10, generally, it is difficult to obtain sufficient total reflection. For example, when a material layer having a refractive index of 1.5 or more is laminated on the upper surface 10a of the light guide plate 10, total reflection cannot be performed on the upper surface 10a of the light guide plate 10. Further, when a material layer having a refractive index slightly smaller than that of the light guide plate 10, for example, about 1.49, is laminated on the upper surface 10a of the light guide plate 10, total internal reflection can be performed on the upper surface 10a of the light guide plate 10, but sufficient total internal reflection cannot be performed because a critical angel is too large. The wavelength conversion layer 30 laminated over the upper surface 10a of the light guide plate 10 generally has a refractive index of about 1.5. When this wavelength conversion layer 30 is directly laminated on the upper surface 10a of the light guide plate 10, it is difficult to obtain sufficient total reflection on the upper surface 10a of the light guide plate 10.

The low refractive layer 20 interposed between the light guide plate 10 and the wavelength conversion layer 30 form an interface together with the upper surface 10a of the light guide plate 10, and has a lower refractive index than the light guide plate 10, so as to allow total reflection to be performed on the upper surface 10a of the light guide plate 10. Further, the low refractive layer 20 has a lower refractive index than the wavelength conversion layer 30, which is a material layer disposed thereon, so as to allow more total reflections to be performed compared to when the wavelength conversion layer 30 is directly disposed on the upper surface 10a of the light guide plate 10.

The difference in refractive index between the light guide plate 10 and the low refractive layer 20 may be 0.2 or more. When the refractive index of the low refractive layer 20 is smaller than the refraction index of the light guide plate 10 by 0.2 or more, sufficient total reflection can be performed through the upper surface 10a of the light guide plate 10. The upper limit of the difference in refractive index between the light guide plate 10 and the low refractive layer 20 is not particularly limited, but may be 1 or less in consideration of the refractive indexes of the generally-used light guide plate 10 and low refractive index layer 20.

The refractive index of the low refractive layer 20 may be in a range of 1.2 to 1.4. Generally, the closer the refractive index of a solid medium is to 1, the more the manufacturing cost thereof increases exponentially. When the refractive index of the low refractive layer 20 is 1.2 or more, an excessive increase in manufacturing cost can be prevented. Further, when the refractive index of the low refractive layer 20 is 1.4 or less, it is advantageous to sufficiently reduce the total reflection critical angle of the upper surface 10a of the light guide plate 10. In an exemplary embodiment, a low refractive layer 20 having a refractive index of about 1.25 may be applied.

The low refractive layer 20 may include voids to exhibit the above-mentioned low refractive index. The voids may be formed in a vacuum, or may be filled with an air layer, gas, or the like. The void space may be defined by particles, matrices, or the like. Details will be described with reference to FIGS. 3 and 4.

Figure 3:
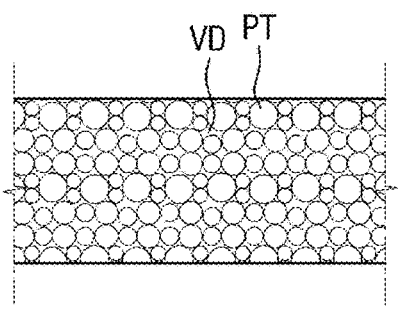
FIG. 3 and FIG. 4 are sectional views of low refractive layers according to various exemplary embodiments.
Figure 4:
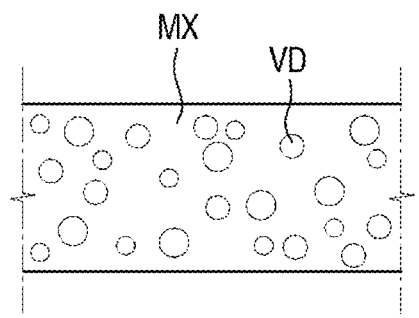

FIGS. 3 and 4 are sectional views of low refractive layers according to various exemplary embodiments.

Referring to FIGS. 3 and 4, in an exemplary embodiment, the low refractive layer 20, as shown in FIG. 3, may include particles PT and voids VD. For example, in the low refractive layer 20, the particles PT may be attached to each other, and the voids may be formed among the particles PT. The voids VD may be entirely or partially connected to each other. In another exemplary embodiment, the low refractive layer 20, as shown in FIG. 4, may include a matrix MX such as a foam resin and a plurality of voids disposed in the matrix MX.

When the low refractive layer 20 includes the voids, the total refractive index of the low refractive layer 20 has a value between the refractive index of the particles PT/the matrix MX and the refractive index of the voids VD. Therefore, even when a material having a refractive index of 1.4 or more is used as the particles PT/matrix MX, the total refractive index of the low refractive layer 20 may have a value of 1.4 or less, for example, a value of about 1.25. In an exemplary embodiment, the particles PT/matrix MX may be made of an organic material such as siloxane, but may also be made of other organic materials or inorganic materials. In an exemplary embodiment, the low refractive layer 20 may further include a filler for adjusting the refractive index and strength of the low refractive layer 20.

The thickness of the low refractive layer 20 may be 0.4 μm to 2 μm. When the thickness of the low refractive layer 20 is 0.4 μm or more in the visible light wavelength range, an effective optical interface can be formed together with the upper surface 10a of the light guide plate 10, so that the total reflection according to Snell's law can be performed well on the upper surface of the light guide plate 10. When the low refractive index layer 20 is too thick, thinning of the optical member 100 is more difficult to obtain, a material cost increases, and the large thickness of the low refractive index layer 20 has a disadvantageous effect on the luminance of the optical member 100, so that the low refractive layer 20 may be desirably formed to have a thickness of 2 μm or less. In an exemplary embodiment, the thickness of the low refractive layer 20 may be about 0.5 μm.

The low refractive layer 20 covers most of the upper surface 10a of the light guide plate 10, and may expose a part of the edge of the light guide plate 10. In other words, the side surface 10s of the light guide plate 10 may protrude with respect to the side surface 20s of the low refractive layer 20. The upper surface 10a of the light guide plate 10, to which the low refractive layer 20 is exposed, provides a space in which the side surface 20s of the low refractive layer 20 can be stably covered by the passivation layer 40.

The low refractive layer 20 may be formed by a method such as coating. For example, the low refractive layer 20 may be formed by applying a composition for the low refractive layer 20 onto the upper surface of the light guide plate 10 by slit coating and then drying and curing the composition. However, the inventive concepts are not limited thereto, and other various lamination methods may be used.

The wavelength conversion layer 30 is disposed on the upper surface 20a of the low refractive layer 20. The wavelength conversion layer 30 converts the wavelength of at least a part of incident light. The wavelength conversion layer 30 may include a binder layer and wavelength conversion particles dispersed in the binder layer. The wavelength conversion layer 30 may further include scattering particles dispersed in the binder layer, in addition to the wavelength conversion particles.

The binder layer is a medium in which the wavelength converting particles are dispersed, and may be made of various resin compositions, which may be generally referred to as a "binder". However, the inventive concepts are not limited thereto. In this specification, the is medium may be referred to as a "binder layer" regardless of its name, other additional functions, constituent materials, and the like, as long as it can disperse the wave conversion particles and/or the scattering particles.

The wavelength conversion particles are particles for converting the wavelength of incident light, and may be, for example, quantum dots (QD), fluorescent material particles, or phosphorescent material particles. A quantum dot is a material having a crystal structure of several nanometers, is composed of several hundreds to several thousands of atoms, and exhibits an quantum confinement effect of increasing an energy bandgap due to a small size. When light having a wavelength higher than the energy bandgap of the quantum dot is applied, the quantum dot absorbs the light to become an excited state, and emits light having a specific wavelength to fall to a ground state. The wavelength of the emitted light has a value corresponding to the energy bandgap. The quantum dots can control the luminescence charracteristics due to the quantum confinement effect by adjusting the size and composition thereof.

The wavelength converting particles may include a plurality of wavelength converting particles for converting incident light to different wavelengths. For example, the wavelength conversion particle may include a first wavelength conversion particle converting incident light of a specific wavelength into light of a first wavelength and emits the light and a second wavelength conversion particle converting incident light of a specific wavelength into light of a second wavelength and emits the light. In an exemplary embodiment, the light emitted from the light source and incident on the wavelength conversion particle is blue light, the first wavelength may be a green wavelength, and the second wavelength may be a red wavelength. For example, the blue wavelength is a wavelength having a peak at 420 to 470 nm, the green wavelength is a wavelength having a peak at 520 nm to 570 nm, and the red wavelength may be is a wavelength having a peak at 620 nm to 670 nm. However, it should be understood that the blue, green, and red wavelengths are not limited to the above examples, and include all wavelength ranges known in the art that can be recognized as blue, green, and red.

In an exemplary embodiment, the blue light incident on the wavelength conversion layer 30 passes through the wavelength conversion layer 30 and simultaneously a part of the blue light enters the first wavelength conversion particles to be converted into a green wavelength and emitted, another part of the blue light enters the second wavelength conversion particles to be converted into a red wavelength and emitted, and a residual part of the blue light is directly emitted without entering the first and second wavelength conversion particles. Therefore, the light having passed through the wavelength conversion layer 30 includes all light of a blue wavelength, light of a green wavelength, and light of a red wavelength. When the ratio of the emitted light of different wavelengths is appropriately adjusted, white light or outgoing light of other colors can be displayed. The converted lights in the wavelength conversion layer 30 are concentrated within a narrow range of specific wavelengths, and have a sharp spectrum with a narrow half width. Therefore, when colors are expressed by filtering the light of such a spectrum with a color filter, color reproducibility can be improved.

Unlike the above exemplary embodiment, incident light is short-wavelength light, such as ultraviolet light, and three kinds of wavelength conversion particles for converting the incident light into light of blue, green, and red wavelengths are disposed in the wavelength conversion layer 30, so as to emit white light.

The wavelength conversion layer 30 may further include scattering particles. The scattering particles may be non-quantum particles, and may also be particles having no wavelength conversion function. The scattering particles can scatter incident light such that is more incident light can be incident onto the wavelength conversion particles. In addition, the scattering particles can serve to uniformly control the emission angle of light for each wavelength. More specifically, when a part of incident light is incident on the wavelength conversion particles to convert a wavelength and then the light of the converted wavelength is emitted, the light has scattering characteristics of emission direction thereof being random. If the scattering particles are not present in the wavelength conversion layer 30, the light of green and red wavelengths emitted after the collision with the wavelength conversion particles has scattering emission characteristics, but the light of a blue wavelength emitted without the collision with the wavelength conversion particles does not have scattering emission characteristics, so that the emission amount of the light of blue/green/red wavelengths will be different depending on the emission angle. The scattering particles provide scattering emission characteristics to the light of a blue wavelength emitted without the collision with the wavelength conversion particles, thereby similarly adjusting the emission angle of light for each wavelength. As the scattering particles, $TiO_2$, $SiO_2$, or the like may be used.

The wavelength conversion layer 30 may be thicker than the low refractive layer 20. The thickness of the wavelength conversion layer 30 may be about 10 μm to 50 μm. In an exemplary embodiment, the thickness of the wavelength conversion layer 30 may be about 15 μm.

The wavelength conversion layer 30 may cover the upper surface 20a of the low refractive index layer 20, and may completely overlap the low refractive index layer 20. The lower surface 30b of the wavelength conversion layer 30 may be in direct contact with the upper surface 20a of the low refractive layer 20. In an exemplary embodiment, the side surface 30s of the wavelength conversion layer 30 may be aligned with the side surface 20s of the low refractive layer 20. The inclination angle of the side surface 30s of the wavelength conversion layer 30 may be smaller than the inclination angle of the side surface 20s of the low refractive layer 20. As described later, when the wavelength conversion layer 30 is formed by slit coating or the like, the side surface 30s of the relatively thick wavelength conversion layer 30 may have a gentle inclination angle smaller than the side surface 20s of the low refractive layer 20. However, the present invention is not limited thereto, and the inclination angle of the side surface 30s of the wavelength conversion layer 30 may be substantially equal to or smaller than the inclination angle of the side surface 20s of the low refractive index layer 20 depending on the forming method.

The wavelength conversion layer 30 may be formed by a method such as coating. For example, the wavelength conversion layer 30 may be formed by applying a wavelength conversion composition onto the light guide plate 10 provided with the low refractive layer 20 and then drying and curing the composition. However, the present invention is not limited thereto, and various other lamination methods may be used.

The passivation layer 40 is disposed on the low refractive layer 20 and the wavelength conversion layer 30. The passivation layer 40 serves to prevent the permeation of moisture and/or oxygen (hereinafter, referred to as "moisture/oxygen"). The passivation layer 40 may contain an inorganic material. For example, the passivation layer 40 may contain silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride, or may be a metal thin film having light transmittance. In an exemplary embodiment, the passivation layer 40 may be made of silicon nitride.

The passivation layer 40 completely covers the low refractive index layer 20 and the wavelength conversion layer 30. The passivation layer 40 completely overlaps the wavelength conversion layer 30 and extends further outwardly therefrom to cover the side surface 30s of the wavelength conversion layer 30 and the side surface 20s of the low refractive layer 20. The passivation layer 40 extends to the upper surface 10a of the edge of the light guide plate 10 exposed by the low refractive layer 20 such that a part of the edge of the passivation layer 40 is in direct contact with the upper surface 10a of the light guide plate 10. In an exemplary embodiment, the side surface 40s of the passivation layer 40 may be aligned with the side surface 10s of the light guide plate 10. The inclination angle of the side surface 40s of the passivation layer 40 may be larger than the inclination angle of the side surface 30s of the wavelength conversion layer 30. Further, the inclination angle of the side surface 40s of the passivation layer 40 may be larger than the inclination angle of the side surface 20s of the low refractive layer 20.

The thickness of the passivation layer 40 may be less than that of the wavelength conversion layer 30, and may be equal to or less than that of the low refractive layer 20. The thickness of the passivation layer 40 may be 0.1 µm to 2 µm. When the thickness of the passivation layer 40 is 0.1 µm or more, the passivation layer can exhibit a significant moisture/oxygen permeation preventing function, and when the thickness thereof is 0.3 µm or more, the passivation layer can have an effective significant moisture/oxygen permeation preventing function. The passivation layer 40 having a thickness of 2 µm or less is advantageous in terms of thinning and transmittance. In an exemplary embodiment, the thickness of the passivation layer 40 may be about 0.4 µm.

The wavelength conversion layer 30, particularly, the wavelength conversion particles included therein, is vulnerable to moisture/oxygen. In the case of a wavelength conversion film, barrier films are laminated on the upper and lower surfaces of the wavelength conversion layer 30 to prevent the permeation of moisture/oxygen. In contrast, in the case of this exemplary embodiment, the wavelength conversion layer 30 is directly disposed without a barrier film, so that a sealing structure for protecting the wavelength conversion layer 30 is required instead of the barrier film. The sealing structure may be realized by the passivation layer 40 and the light guide plate 10.

The gate through which moisture can permeate the wavelength conversion layer 30 is the upper surface 30a, side surface 30s, and lower surface 30b of the wavelength conversion layer 30. As described above, since the upper surface 30a and side surface 30s of the wavelength conversion layer 30 are covered and protected by the passivation layer 40, the permeation of moisture/oxygen can be blocked or at least reduced (hereinafter referred to as "blocked/reduced").

Meanwhile, the lower surface 30b of the wavelength conversion layer 30 is in contact with the upper surface 20a of the low refractive layer 20. In this case, when the low refractive layer 20 includes voids, or is made of an organic material, moisture can move in the low refractive layer 20, so that the permeation of moisture/oxygen into the lower surface 30b of the wavelength conversion layer 30 can be conducted. However, since the side surface 20s of the low refractive layer 20 is covered and protected by the passivation layer 40, the permeation of moisture/oxygen through the side surface 20s of the low refractive layer 20 can be blocked/reduced. Even when the low refractive layer 20 protrudes from the wavelength conversion layer 30 to allow a part of the upper surface 20a thereof to be exposed, the corresponding portion is covered and protected by the passivation layer 40, so that the permeation of moisture/oxygen can be blocked/reduced. The lower surface 20b of the low refractive layer 20 is in contact with the light guide plate 10. When the light guide plate 10 is made of an inorganic material such as glass, the permeation of moisture/oxygen can be blocked/reduced in the same manner as the passivation layer 40. Consequently, since the surface of the laminate of the low refractive layer 20 and the wavelength conversion layer 30 is surrounded and sealed by the passivation layer 40 and the light guide plate 10, even when the transfer path of moisture/oxygen is provided in the low refractive layer 20, the moisture/oxygen permeation itself can be blocked/reduced by the sealing structure, so that the deterioration of the wavelength conversion particles caused by moisture/oxygen can be prevented or at least alleviated.

The passivation layer 40 may be formed by a method such as vapor deposition. For example, the passivation layer 40 may be formed on the light guide plate 10, on which the low refractive layer 20 and the wavelength conversion layer 30 are sequentially formed, by using chemical vapor deposition. However, the present invention is not limited thereto, and various other lamination methods may be used.

As described above, the optical member 100, which is an integrated single member, can perform both a light guide function and a wavelength conversion function. The integrated single member can simplify an assembly process of a display device. Further, the optical member 100 can allow total reflection to be effectively conducted on the upper surface 10a of the light guide plate 10 by disposing the low refractive layer 20 on the upper surface 10a of the light guide plate 10, and can prevent the deterioration of the wavelength conversion layer 30 by sealing the low refractive layer 20 and the wavelength conversion layer 30 with the passivation layer 40 or the like.

In addition, the wavelength conversion layer 30 of the optical member 100 and the sealing structure thereof can reduce a manufacturing cost and thickness, compared with a wavelength converting film provided as a separate film. Specifically, the wavelength conversion film is configured such that barrier films are attached to the upper and lower surfaces of the wavelength conversion layer 30. In this case, the barrier film is expensive to form, and has a relatively large thickness of 100 µm or more, so that the total thickness of the wavelength conversion film is about 270 µm. In contrast, since the optical member according to exemplary embodiments is formed of the low refractive layer 20 having a thickness of about 0.5 µm and the passivation layer having a thickness of about 0.4 µm, the total thickness of the optical member 100 excluding the light guide plate 10 can be maintained at a level of about 16 µm, so that the thickness of the display device 1000 employing the optical member 100 can be reduced. Further, since the optical member according to exemplary embodiments is not provided with an expensive barrier film, manufacturing costs can be controlled and reduced to a lower level than that of the wavelength conversion film.

Hereinafter, the optical pattern 70 will be described in detail.

Figure 5:
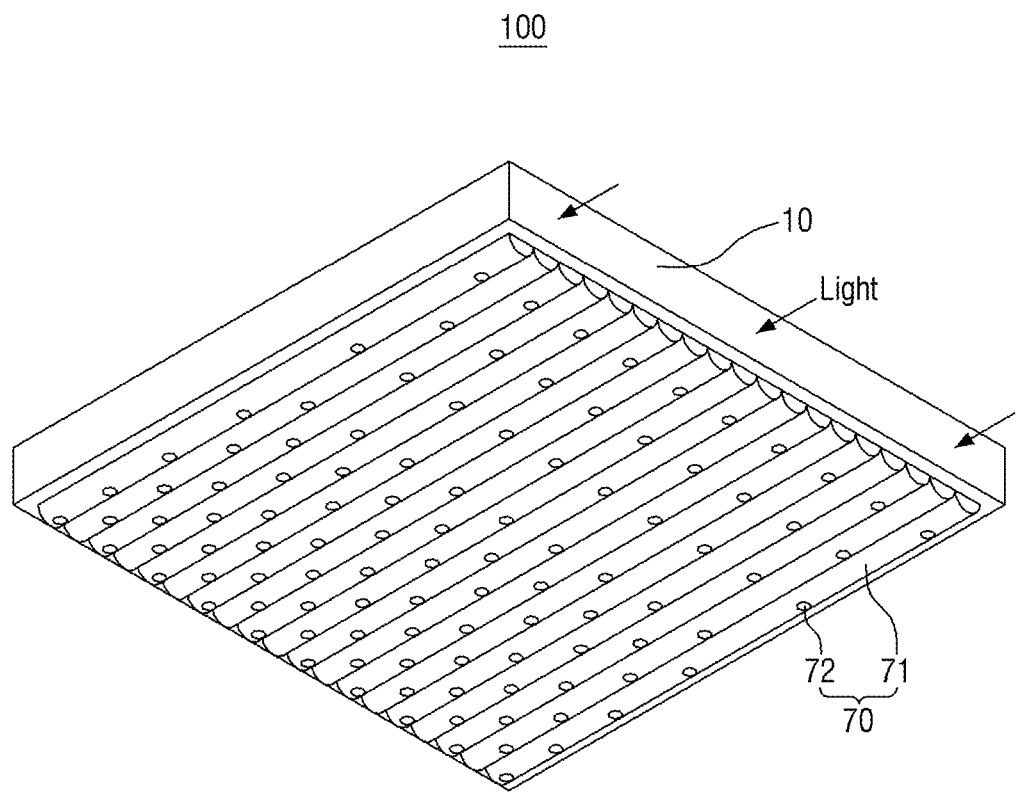
FIG. 5 is a bottom perspective view of an optical member according to an exemplary embodiment.
Figure 6:
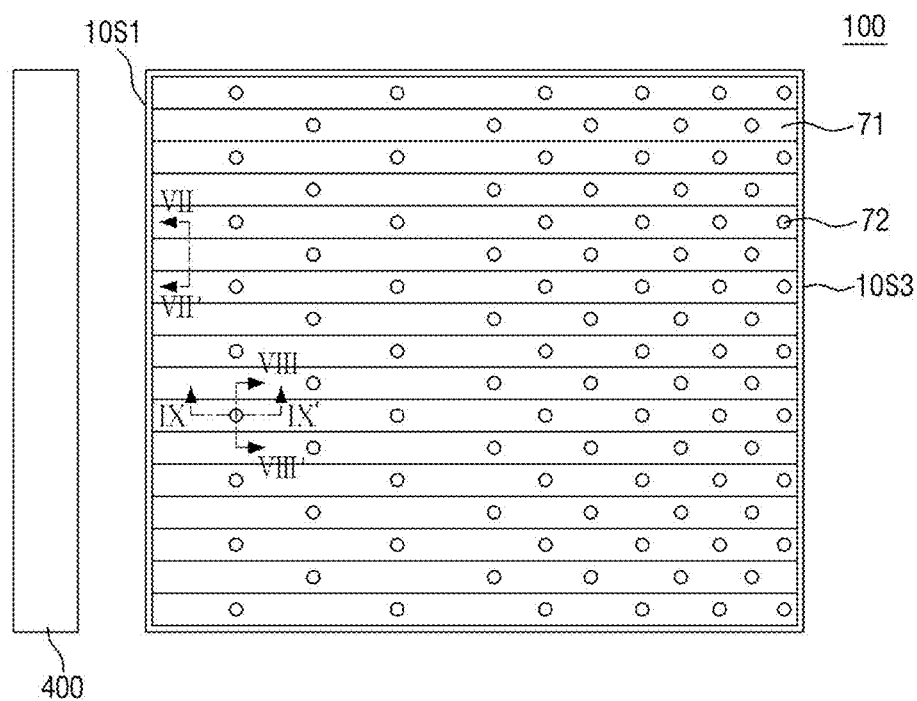
FIG. 6 is a bottom view of an optical member according to an exemplary embodiment.
Figure 7:
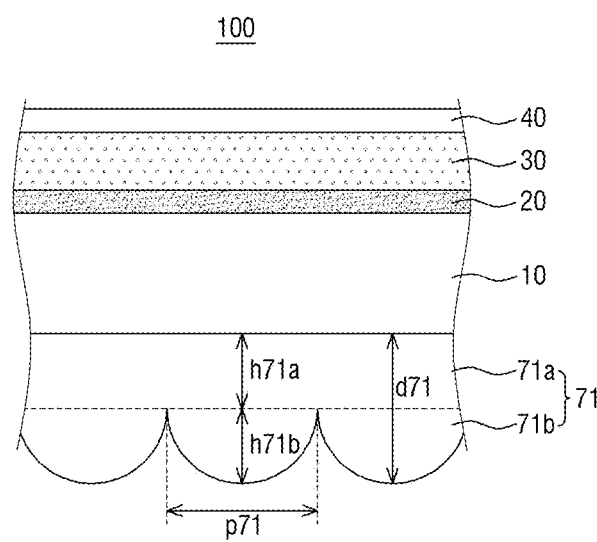
FIG. 7 is a sectional view taken along the line VII-VII' of FIG. 6.

FIG. 5 is a bottom perspective view of an optical member according to an exemplary embodiment. FIG. 6 is a bottom view of an optical member according to an exemplary embodiment. FIG. 7 is a sectional view taken along the line VII-VII' of FIG. 6.

Referring to FIGS. 5 to 7, the optical pattern 70 is disposed on the lower surface 10b of the light guide plate 10. The optical pattern 70 adjusts the traveling path of light to allow the light guide plate 10 to uniformly supply the light toward the display panel 300. The optical pattern 70 covers most of the lower surface 10b of the light guide plate 10, and may expose a part of the edge of the light guide plate 10. In other words, the side surface 10s of the light guide plate 10 may protrude with respect to the side surface 70s of the optical pattern 70. It is possible to prevent the optical pattern 70 from protruding outward beyond the light guide plate 10 by securing a certain space between the side surface 70s of the optical pattern 70 and the side surface 10s of the light guide plate 10. Further, in the case of forming the optical pattern 70 using an imprinting method, it is possible to prevent a resin from overflowing toward the side face 10s of the light guide plate 10 during a resin application process.

The side surface 70s of the optical pattern 70 may be substantially aligned with the side surface 20s of the low refractive layer 20.

In an exemplary embodiment, the optical pattern 70 may be made of a material having a refractive index similar to that of the light guide plate 10. When the refractive index of the optical pattern is the same as or similar to the refractive index of the light guide plate, light may be propagated like a single integrated light guide plate without recognizing the interface between the lower surface 10b of the light guide plate 10 and the optical pattern 70 as an optical interface. However, the present invention is not limited thereto, and the optical pattern 70 and the light guide plate 10 may have different refractive indexes from each other. In this case, refraction and reflection can be performed at the interface, but the overall light guide function can be maintained.

The optical pattern 70 may be formed by applying the resin onto the light guide plate 10 using an imprinting method, in which case a separate adhesive member may be omitted.

The optical pattern 70 includes a first pattern 71 disposed over most of the lower surface 10b of the light guide plate 10 and a second pattern 72 partially disposed on the first pattern 71. The first pattern 71 includes a convex surface, has a continuous line shape extending from the light incidence surface 10s1 to the light facing surface 10s3, and guides the light incident into the light guide plate 10 to be straightly traveled toward the light facing surface 10s3. That is, the first pattern 71 refracts light traveling toward both side surfaces 10s2 and 10s4 adjacent to the light facing surface 10s3 to allow the refracted light to travel toward the light facing surface 10s3.

The second pattern 72 has a groove shape formed on the first pattern 71, and refracts light to guide the travelling direction of the light toward the display panel 300. That is, the second pattern 72 refracts the light traveling through the total reflection in the light guide plate 10 and the optical pattern 70 to allow the light to travel toward the display panel 300.

The first pattern 71 may include a base portion 71a and a pattern portion 71b. The base portion 71a is a region between the pattern portion 71b and the light guide plate 10, and means a portion where no pattern is formed. The base portion 71a supports the pattern portion 71b such that the first pattern 71 can be sufficiently attached to the light guide plate 10.

The pattern portion 71b means a portion where the pattern is formed. The pattern portion 71b may adjust the path of light. That is, the path of light is adjusted such that the light entering the light incidence surface 10s1 passes through the base portion 71a, and is refracted/reflected at the interface formed by the pattern portion 71b and an air layer to travel toward the light facing surface 10s3. Specifically, a part of light emitted from the light source 400 travels toward the light facing surface 10s3, and another part of the light travels toward both side surfaces 10s2 and 10s4 between the light facing surface 10s3 and the light incidence surface 10s1. The traveling direction of the light may be changed such that a part of the light traveling toward both side surfaces 10s2 and 10s4 is refracted at the interface between the pattern portion 71b and the air layer to travel toward the light facing surface 10s3.

The pattern portion 71b may have a straight line shape extending continuously from the light incidence surface 10s1 to the light facing surface 10s3, and may have various sectional shapes such as a semicircle, a triangle, and a rectangle. The sectional shape of the pattern portion 71b may be constant along the extended straight line, but the present invention is not limited thereto. For example, the pattern portion 71b may have a lenticular shape as shown in FIG. 7, and may have a semi-circular section whose size is constant from the light incidence surface 10s1 to the light facing surface 10s3. Although not shown in the drawings, the semi-circular section of the pattern portion 71b may increase in size from the light incidence surface 10s1 to the light facing surface 10s3.

The thickness d71 of the first pattern 71 can be calculated as the sum of the height h71a of the base portion 71a and the height h71b of the pattern portion 71b. The base portion 71a has the same height h71a throughout the first pattern 71, whereas the height h71b of the pattern 71b may vary depending on the shape of the pattern. Therefore, the change of the thickness d71 of the first pattern 71 depends on the change of the height h71b of the pattern portion 71b. Illustratively, when the first pattern 71 is a lenticular pattern, a position where the thickness d71 of the first pattern 71 is largest may correspond to a position where the height h71b of the pattern portion 71b is highest, that is, a ridge. Further, a position where the thickness d71 of the first pattern 71 is smallest may correspond to a valley. At the valley, the thickness d71 of the first pattern 71 may be equal to the height h71a of the base portion 71a.

The maximum value of the thickness d71 of the first pattern 71 may be about 40 µm or less. When the thickness d71 of the first pattern 71 is more than 40 µm, it makes it more difficult to reduce the thickness of the optical member 100, a material cost increases, and a possibility of the first pattern being detached from the light guide plate 10 with the increase in weight may increase. In addition, when the first pattern 71 is formed by a imprinting method, UV curing time increases according to the increase of the thickness of the applied resin, so that a possibility of the first pattern 71 becoming yellow increases. Although the lower limit of the thickness d71 of the first pattern 71 is not limited, it is preferable that the base portion 71a and the pattern portion 71b have enough thickness to exhibit a sufficient effect.

The height h71a of the base portion 71a and the height h71b of the pattern portion 71b may be determined in consideration of the thickness d71 of the first pattern 71. That is, the sum of the height h71b of the pattern portion 71b and the height h71a of the base portion 71a may be about 40 µm or less. The height h71a of the base portion 71a may be within about 20 µm, and the height h71b of the pattern portion 71b may be in a range of 5 µm to 20 µm. In general, as the height h71b of the pattern portion 71b is greater than the width p71 of the pattern portion 71b, that is, the pattern portion 71b protrudes from the base portion 71a, the straightness of light increases, but it is practically difficult to increase the height h71b of the pattern portion 71b indefinitely in consideration of the thickness d71 of the first pattern 71. Further, when the height h71a of the base portion 71a is less than about 20 µm, considering that it is difficult to sufficiently support the pattern portion 71b, the height h71b of the pattern portion 71b may be about 20 µm or less. In addition, the height h71b of the pattern portion 71b may be 5 µm or more. When the height h71b of the pattern portion 71b is 5 µm or more, the surface area of the pattern portion 71b is secured to some extent, and sufficient refraction for change the path of light may occur.

The pitch p71 of the pattern portion 71b may be determined in consideration of the height h71b of the pattern portion 71b. When the ratio of pitch p71 to height h71b of the pattern portion 71b is excessively large, the surface area of the pattern portion 71b becomes small, and thus a probability of light being refracted at the surface of the pattern portion 71b is reduced. Further, when the ratio of pitch p71 to height h71b of the pattern portion 71b is excessively small, it may be difficult to ensure sufficient durability to support the pattern portion 71b protruding from the base portion 71a. Taking this into consideration, the pitch p71 of the pattern portion 71b may be in a range of 70 μm to 150 μm. That is, when the pitch p71 of the pattern portion 71b is 150 μm or less, the first pattern 71 is effective in inducing the straightness of light within the aforementioned range of the height h71b of the pattern portion 71b. Further, when the pitch p71 of the pattern portion 71b is 70 μm or more, it is advantageous to secure durability for maintaining the shape of the pattern portion 71b within the aforementioned range of the height h71b of the pattern portion 71b. In addition, in the case where the first pattern 71 is formed by an imprinting method, when a stamper is separated from a resin by the attraction force between the resin, which is the material of the first pattern 71, and the stamper, the resin may fall off. However, when the pitch p71 of the pattern portion 71b is 70 μm or more, a sufficient attractive force between the resins can be ensured to such a degree that the resin does not fall off due to the stamper. In an exemplary embodiment, the height h71b of the pattern portion 71b may about 8.5 μm, and the pitch p71 of the pattern portion 71b may be about 70 μm.

The second pattern 72 may have an uneven shape formed on the surface of the first pattern 71. Specifically, the plurality of second patterns 72 may be provided on the surface of the first pattern 71, and the second pattern 72 may have a concave pattern recessed from the surface of the first pattern 71 or a convex pattern shape protruding from the surface of the first pattern 71. Further, the plurality of second patterns 72 may include both the concave pattern shape and the convex pattern shape. The second pattern 72 may be a refraction pattern for refracting light to guide the light toward the display panel 300. That is, the incident angle of the light traveling in the light guide plate 10 and the optical pattern 70 through total reflection becomes smaller than a critical angle at an optical interface formed by the second pattern 72 and an air layer, so that the traveling path of the light may be changed toward the display panel 300.

The second patterns 72 may be arranged at different density along the length direction of the first pattern 71. For example, a region adjacent to the light incidence surface 10s1, to which a relatively large amount of light is guided, may has low arrangement density, and a region adjacent to the light facing surface 10s3, to which a relatively small amount of light is guided, may have high arrangement density. As another example, the area of the second pattern 72 in the region adjacent to the light incidence surface 10s1 may be made smaller, and the area of the second pattern 72 may be made larger toward the region adjacent to the light facing surface 10s3.

The second patterns 72 may be regularly arranged along the width direction of the first pattern 71, but the second patterns 72 may also be irregularly arranged. However, in order to uniformly supply light toward the display panel 300, it may be advantageous to arrange the second patterns 72 at similar density along the width direction. The second pattern 72 may be disposed not only at the ridge of the first pattern 71 but also at the valley of the first pattern 71, and may also be disposed over the ridge and the valley. In an exemplary embodiment, the second patterns 72 may be arranged to be staggered along the width direction of the first pattern 71. That is, when the length direction of the first pattern 71 is a row and the width direction of the first pattern 71 is a column, the second patterns 72 arranged in the same column may not be arranged in the adjacent row. In other words, the second patterns 72 arranged in the same column may be arranged only in the odd-numbered rows, and may not be arranged in the even-numbered rows.

Figure 8:
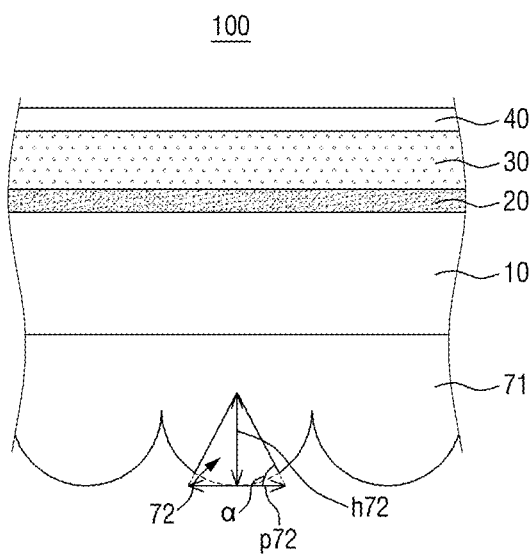
FIG. 8 is a sectional view taken along the line VIII-VIII' of FIG. 6.
Figure 9:
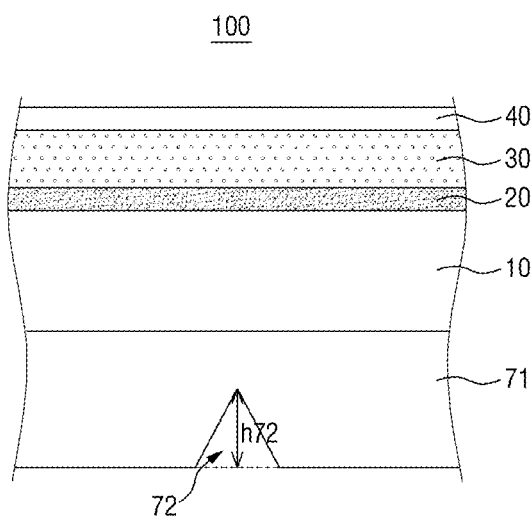
FIG. 9 is a sectional view taken along the line IX-IX' of FIG. 6.

FIG. 8 is a sectional view taken along the line VIII-VIII' of FIG. 6. FIG. 9 is a sectional view taken along the line IX-IX' of FIG. 6.

Referring to FIGS. 8 and 9, the second pattern 72 may have a groove shape recessed from the surface of the first pattern 71. Specifically, the second pattern 72 may be a conical concave groove pattern whose bottom surface is elliptical. However, the present invention is not limited thereto, and the second pattern 72 may be a concave groove pattern having a conical shape, a truncated conical groove or a dome-shaped concave groove, the bottom surface of each which is circular.

The height h72 of the second pattern 72 may be in a range of 10 μm to 20 μm. The maximum value of the height h72 of the second pattern 72 may have a value of about 20 μm or less which is the height h71a of the base portion 71a of the first pattern 71. That is, when the second pattern 72 is formed at a position where the thickness d71 of the first pattern 71 is the thinnest, that is, the thickness d71 of the first pattern 71 is equal to the height h71a of the base portion 71a, the second pattern 72 cannot be formed deeper than the first pattern 71, so that the height h72 of the second pattern 72 may be limited by the height h71a of the base portion 71a. In addition, considering the traveling path of light, the height h72 of the second pattern 72 is 10 or more, which is advantageous in scattering light and guiding the scattered light toward the display panel 300.

The inclination angle α of the second pattern 72 may be in a range from 7.5° to 55°. When the inclination angle α is less than 7.5°, it is difficult to set light on the traveling path of the light straightly traveling toward the light facing surface 10s3. Therefore, when the inclination angle α is 7.5° or more, it is possible to guide more light traveling paths toward the display panel 300. Further, when the inclination angle α is more than 55°, the incident angle of light with respect to the second pattern 72 increases, and thus a probability of total reflection increases, so that the traveling path of light may be reversed toward the incident surface.

Figure 10:
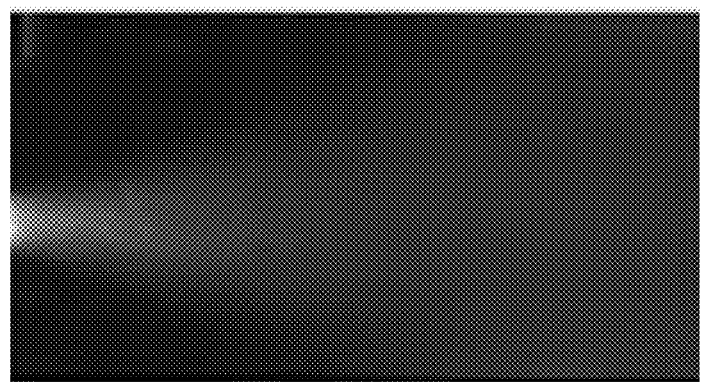
FIG. 10 and FIG. 11 are photographs of images showing the results of measuring the luminous intensity using the respective light guide plates.
Figure 11:
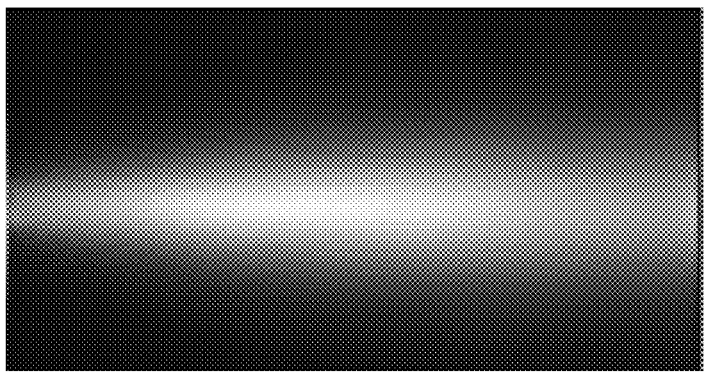

In order to experimentally examine the effect of improving the straightness of light by the optical pattern 70, two light guide plates 10 formed of glass were prepared. One light guide plate 10, as a comparative example, was provided with no optical pattern 70, and the other light guide plate, as an example, was provided on the lower surface thereof with an optical pattern 70 including a base portion 71a having a height h71a of 20 μm, a pattern portion 71b having a height h71b of 8.5 μm and a pitch p71b of 70 μm, and a second pattern 72 having a height h72 of 20 μm and a pitch p72 of 100 μm. FIGS. 10 and 11 show photographs of the results of measuring the luminous intensity using the respective light guide plates 10. The ratios of amounts of light reaching the points A, B, C and D in FIGS. 10 and 11 are shown in Table 1 below.

TABLE 1

|  | Comparative Example | Example |
| --- | --- | --- |
| Ratio of light amount A/light amount B (%) | 76.8 | 15.5 |
| Ratio of light amount C/light amount D (%) | 98.2 | 25.7 |

Referring to Table 1 and FIGS. 10 and 11, in the case of the Comparative Example, the ratio of the amount of light reaching the point A and the amount of light reaching the point B (hereinafter, referred to as "ratio of light amount A/light amount B") is 76.8%. In contrast, in the case of the light guide plate 10 according to an exemplary embodiment of the present invention, the ratio of light amount A/light amount B is 15.5%. In the case of the Comparative Example, the ratio of light amount C/light amount D is 98.2%. In contrast, in the case of the light guide plate 10 according to an exemplary embodiment of the present invention, the ratio of light amount C/light amount D is 25.7%. As the amount of light traveling toward the light facing surface 10s3 increases, the amounts of light measured at the points B and D increase, so that the ratio of light amount A/light amount B and the ratio of light amount C/light amount D decrease. That is, it can be ascertained that the light guide plate 10 including the optical pattern 70 according to an exemplary embodiment of the present invention is effective in improving the straightness of the light path.

Hereinafter, optical patterns according to other exemplary embodiments will be described. In the following exemplary embodiments, a description of the same configuration as that of the previously described exemplary embodiment will be omitted or simplified, and differences will be mainly described.

FIGS. 12 to 16 are sectional views of an optical member showing the shape and arrangement of a second pattern of optical patterns according to various exemplary embodiments.

Figure 12:
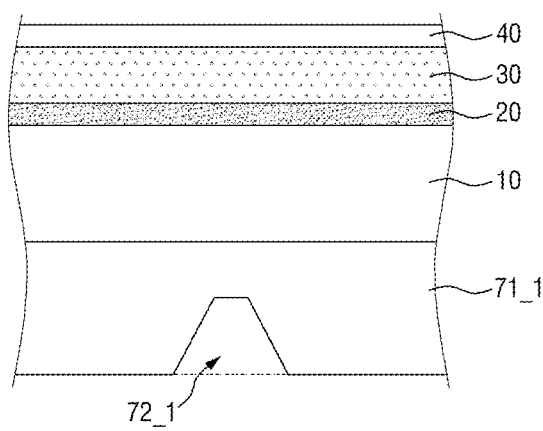
FIG. 12, FIG. 13, FIG. 14, FIG. 15, and FIG. 16 are sectional views of an optical member showing the shape and arrangement of a second pattern of optical patterns according to various exemplary embodiments

Referring to FIG. 12, the second pattern 72_1 of the optical member 101 may be a truncated conical groove whose top surface is elliptical. Specifically, the long side of the ellipse forming the top surface may be parallel to the length direction of the first pattern 71_1. In this case, the second pattern 72_1 may guide the traveling path of light toward the display panel 300 and may also guide the traveling path of light toward the light facing surface 10s3. Therefore, the luminance uniformity can be further improved.

Figure 13:
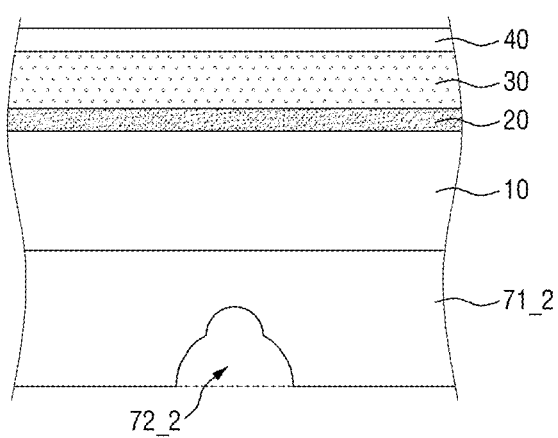
Figure 14:
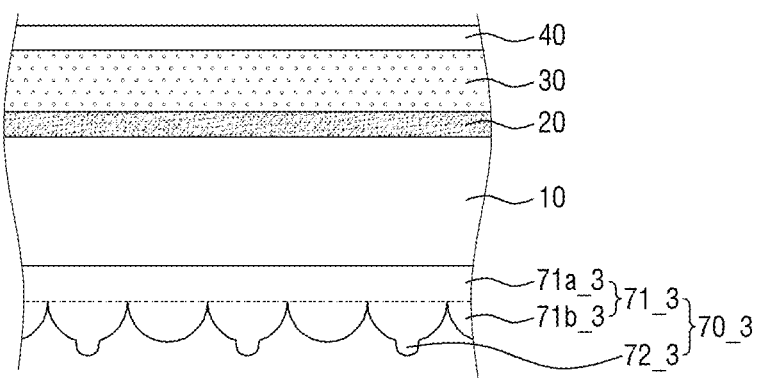
Figure 15:
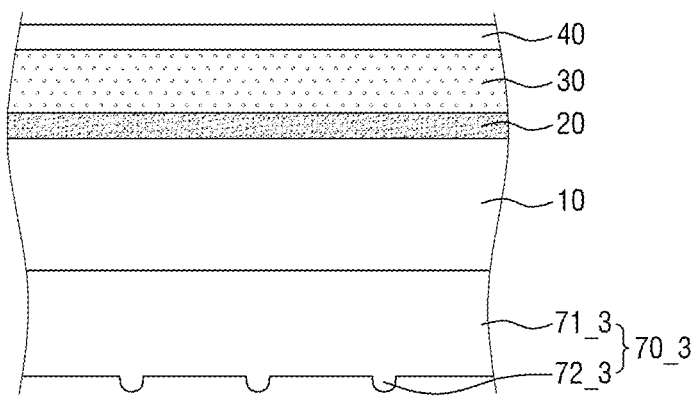

Referring to FIG. 13, the second pattern 72_2 of the optical member 102 may be a concave groove having a shape in which two hemispheres of different diameters are laminated. Generally, the concave groove may have a shape in which a hemisphere of a smaller diameter is laminated on a hemisphere of a larger diameter, but is not limited thereto. However, when the second pattern 72_2 is formed by an imprinting method, an intaglio groove having a reverse tapered shape cannot be formed.

Referring to 14 and 15, the second pattern 72_3 of the optical member 103 may have a convex pattern shape protruding from the surface of the first pattern 71_3. In an exemplary embodiment, the second pattern 72_3 may be a dome-shaped convex pattern. In another exemplary embodiment, the second pattern 72_3 may be a convex pattern protruding in a conical shape. However, the shape of the second pattern is not limited as long as it can perform a function of the second pattern 72_3 such as a truncated conical shape, a square truncated pyramid shape, or the like. Even in the case where the second pattern 72_3 is a convex pattern, similarly to the case of the concave pattern, it is possible to perform a function of changing the path of light toward the display panel 300 by adjusting the path of the light totally reflected in the light guide plate 10 and the first pattern 71_3.

In addition, when the second pattern 72_3 has a convex pattern shape, it is possible to increase the light emission efficiency of the second pattern 72_3 through surface treatment such as haze treatment of the second pattern 72_3.

When the second pattern 72_3 has a convex pattern shape, the height of the base portion 71a_3 of the first pattern 71_3 may be lower than the height of the base portion 71a of the first pattern 71, compared to when the second pattern 72 has a concave groove shape. In this case, the height of the pattern portion 71b_3 of the first pattern 71_3 can be increased, and thus the straightness of the light path can be improved.

Figure 16:
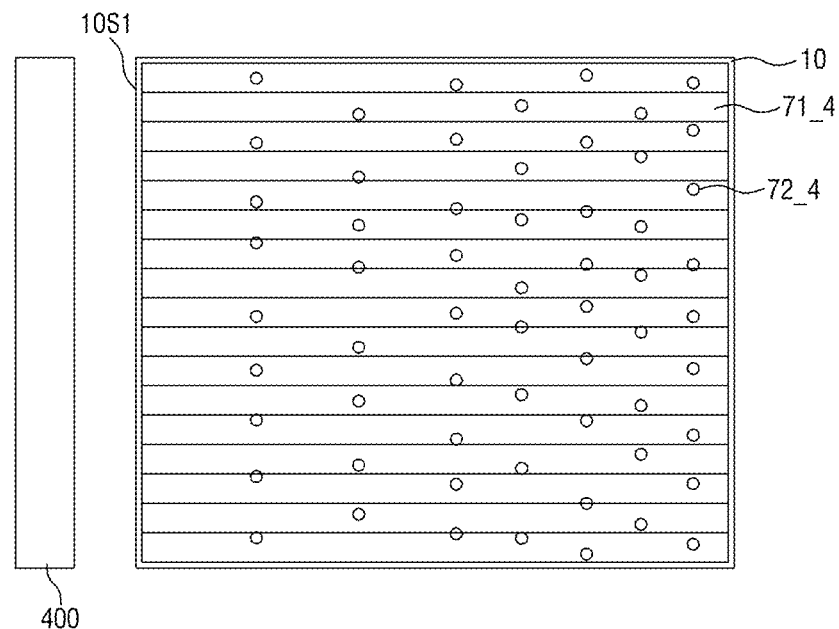

Referring to FIG. 16, the second patterns 72_4 of the optical member 104 may be irregularly arranged with an increase in density from the light incidence surface 10s1 toward the light facing surface 10s3. Specifically, the second patterns 72_4 may be randomly arranged without intervals defined in the width and length directions of the first pattern 71_4.

As described above, the optical pattern 70, as a single pattern in which the first pattern 71 and the second pattern 72 are integrated, can perform both a function of guiding light from the light incidence surface 10s1 toward the light facing surface 10s3 and a function of changing the path of the light toward the display panel 300.

Figure 17:
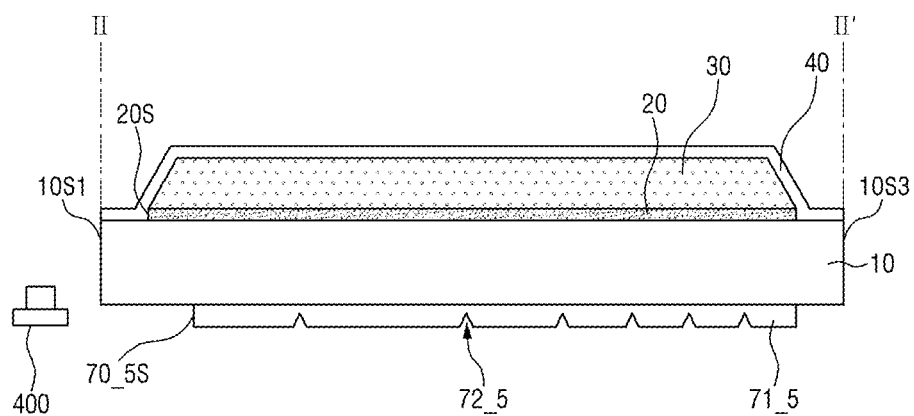
FIG. 17 is a sectional view of an optical member according to another exemplary embodiment.

FIG. 17 is a sectional view of an optical member according to another exemplary embodiment.

Referring to FIG. 17, the side surface 70_5s of the optical pattern 70_5 may be located inward the side surface 20s of the low refractive layer 20 from the light incidence surface 10s1 of the light guide plate 10 of the optical member 105. That is, the shortest distance from the light incidence surface 10s1 of the light guide plate 10 to the side surface 20s of the low refractive layer 20 may be less than the shortest distance from the light incidence surface 10s1 of the light guide plate 10 to the side surface 70_5s of the optical pattern 70_5.

The emission amount of light on the upper surface 10a of the light guide plate 10 may differ for each region. For example, in the vicinity of the light incidence surface 10s1, a relatively large amount of light enters the upper surface 10a of the light guide plate 10 at an angle smaller than the critical angle of total reflection. Therefore, in the vicinity of the light incidence surface 10s1, the emission amount of light may be greater than that in other regions. Furthermore, when the low refractive layer 20 is disposed on the upper surface 10a of the light guide plate 10 so as to integrate them, the critical angle becomes larger than that of an air layer, and the emission amount of light in the vicinity of the light incidence surface 10s1 can be further increased. Like this, the light incidence surface 10s1 of the light guide plate 10 may have a larger emission amount of light than the central portion thereof, which can be viewed as light leakage in a display screen. The side surface 70_5s of the optical pattern 70_5 may be disposed inward from the light incidence surface 10s1 at a predetermined distance to reduce light leakage at the light incidence surface 10s1.

Figure 18:
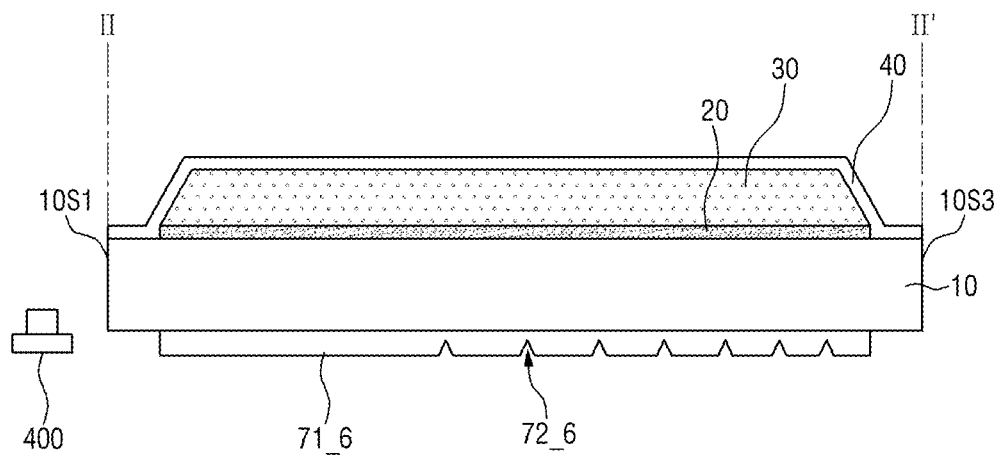
FIG. 18 is a sectional view of an optical member according to still another exemplary embodiment.

FIG. 18 is a sectional view of an optical member according to still another exemplary embodiment.

Referring to FIG. 18, the second pattern 72_6 of the optical member 106 may be omitted in the region adjacent to the light incidence surface 10s1. Considering that the second pattern 72_6 has an effect of guiding light toward the display panel 300, the second pattern 72_6 may not be formed in the region adjacent to the light incidence surface 10s1 where a light leakage phenomenon occurs.

Figure 19:
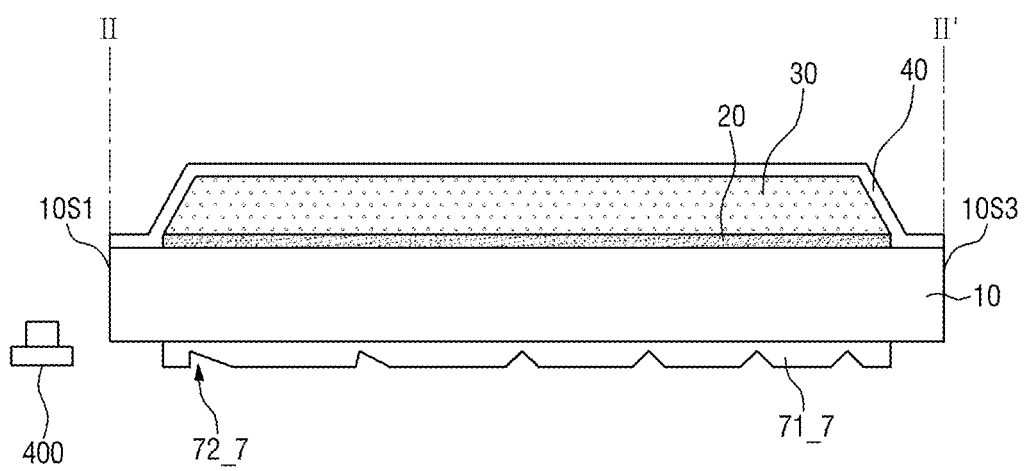
FIG. 19 is a sectional view of an optical member according to still another exemplary embodiment.

FIG. 19 is a sectional view of an optical member according to still another exemplary embodiment.

Referring to FIG. 19, the section of the second pattern 72_7 in the region adjacent to the light incidence surface 10s1 of the optical member 107 may be a right triangle. Specifically, one side orthogonal to the surface of the first pattern 71_7 is disposed to be relatively adjacent to the light incidence surface 10s1, and the hypotenuse of the right angle may be disposed to be relatively adjacent to the light facing surface 10s3. The light incident through the light incidence surface 10s1 may be totally reflected at the optical interface formed by the hypotenuse of the second pattern 72_7 and the air layer to travel toward the light facing surface 10s3.

As the distance from the light incidence surface 10s1 increases, the angle formed by the one side of the second pattern 72_7 and the surface of the first pattern 71_7 becomes smaller than 90°. That is, as the distance from the light incidence surface 10s1 increases, the section of the second pattern 72_7 may have a shape similar to an equilateral triangle or an isosceles triangle.

As described above, the light totally reflected by the second patterns 72_5, 72_6, and 72_7 in the region adjacent to the light incidence surface 10s1 travels toward the light facing surface 10s3, thereby preventing the light leakage phenomenon and increasing the luminance uniformity.

Figure 20:
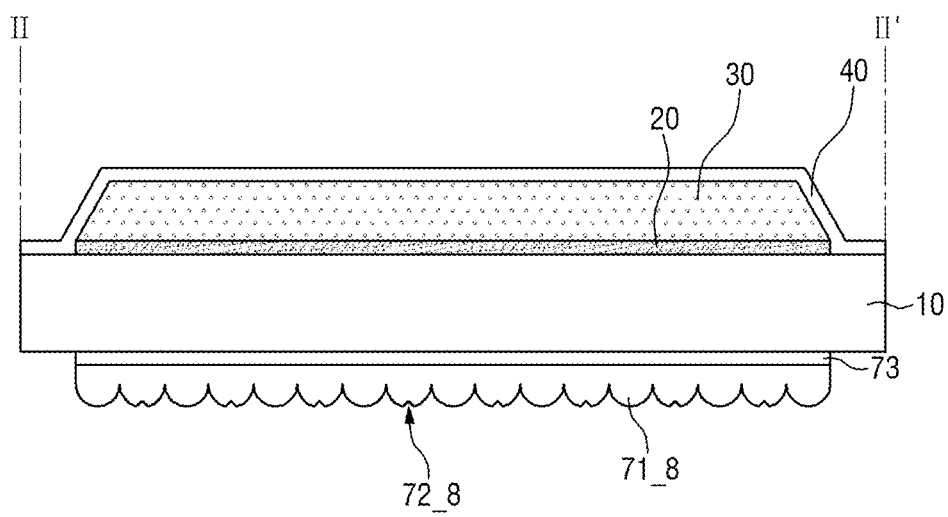
FIG. 20 is a sectional view of an optical member according to still another exemplary embodiment.

FIG. 20 is a sectional view of an optical member according to still another exemplary embodiment.

Referring to FIG. 20, an auxiliary member 73 may be interposed between the light guide plate 10 and optical pattern 70_8 in the optical member 108. The auxiliary member 73 may be an adhesion assisting member for increasing the coupling force between the optical pattern 70_8 and the light guide plate 10, or may be a refractive index adjusting member for adjusting a refractive index, but the present invention is not limited thereto. In an exemplary embodiment, when the light guide plate 10 and the optical pattern 70_8 have different refractive indexes, the auxiliary member 73 may be a refractive index adjusting member having a refractive index corresponding to a middle value of the refractive indexes of the light guide plate 10 and the optical pattern 70_8. That is, when the refractive index of the light guide plate 10 is about 1.5 and the refractive index of the optical pattern 70_8 is about 1.6, an auxiliary member 73 having a refractive index of about 1.55 may be interposed between the light guide plate 10 and the optical pattern 70_8.

The auxiliary member 73 may be disposed on the same region as the optical pattern 70_8 on the plane. That is, the auxiliary member 73 may be disposed over the entire surface of the lower surface 10b of the light guide plate 10 and may be spaced apart from the side surface 10s of the light guide plate 10 by a predetermined distance.

Figure 21:
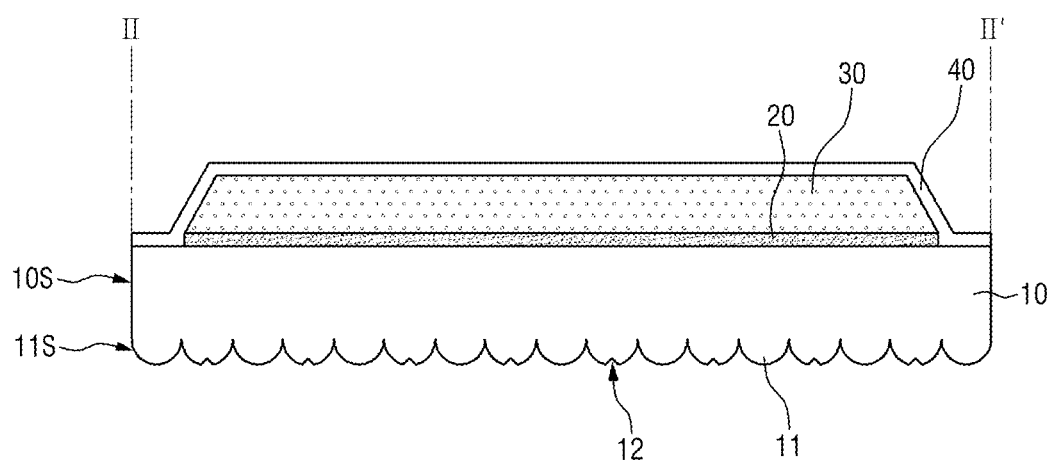
FIG. 21 is a sectional view of an optical member according to still another exemplary embodiment.

FIG. 21 is a sectional view of an optical member according to still another embodiment.

Referring to FIG. 21, the optical patterns 11 and 12 of the optical member 109 may be integrally formed with the light guide plate 10. That is, the optical patterns 11 and 12 may be formed in the shape of the light guide plate 10 itself. In this case, the first pattern 11 may be patterned simultaneously with the formation of the light guide plate 10. When the first pattern 11 is formed in the shape of the light guide plate 10 itself, the base portion may be omitted. In other words, since the light guide plate 10 and the pattern portion are continuous, the light guide plate 10 supports the pattern portion, so that a separate base portion may not be required.

In an exemplary embodiment, the first pattern 11 may be formed by an extrusion method, and the second pattern 12 may be formed by directly irradiating the first pattern 11 with a laser. When the first pattern 11 is formed by the extrusion method, the side surface 10s of the light guide plate 10 and the side surface 11s of the first pattern 11 may be substantially aligned with each other. However, the present invention is not limited thereto, and the side surface 11s of the first pattern 11 may be located inward with respect to the side surface 10s of the light guide plate 10.

In addition, when the laser is used, the second pattern 12 can be patterned more delicately.

The aforementioned optical member can be applied to a display device, a lighting device, and the like. Hereinafter, an exemplary embodiment of a display device including an optical member will be described in detail.

Figure 22:
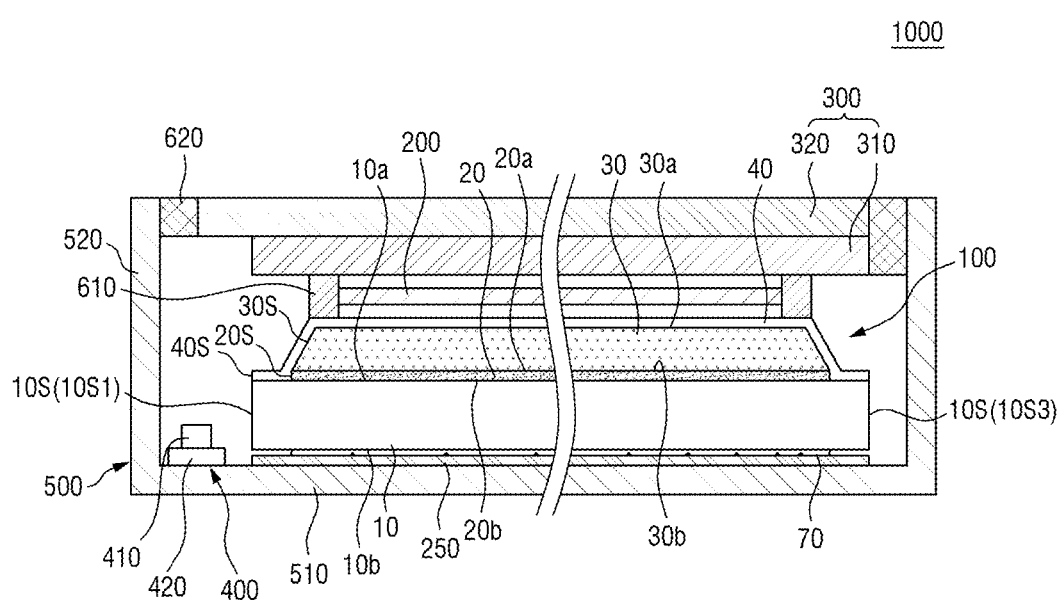
FIG. 22 is a sectional view of a display device according to an exemplary embodiment.

FIG. 22 is a sectional view of a display device according to an exemplary embodiment.

Referring to FIG. 22, a display device 1000 includes a light source 400, an optical member 100 disposed on an emission path of the light source 400, and a display panel 300 disposed over the optical member 100.

As the optical member 100, all of the aforementioned optical members may be applied. FIG. 22 illustrates a case where the optical member of FIG. 2 is applied.

The light source 400 is disposed near one side of the optical member 100. The light source 400 may be disposed adjacent to the light incidence surface 10s1 of the light guide plate 10 of the optical member 100. The light source 400 may include a plurality of point light sources or line light sources. The point light source may be a light emitting diode (LED) light source 410. The plurality of LED light sources 410 may be mounted on a printed circuit board 420. The LED light source 410 may emit blue light.

The blue light emitted from the LED light source 410 is incident on the light guide plate 10 of the optical member 100. The light guide plate 10 of the optical member 100 guides light and emits the light through the upper surface 10a or lower surface 10b of the light guide plate 10. The wavelength conversion layer 30 of the optical member 100 converts a part of the blue light incident from the light guide plate 10 into light of another wavelength such as green light or red light. The converted green light or red light is emitted upward together with the unconverted blue light and provided toward the display panel 300.

The display device 1000 may further include a reflection member 250 disposed under the optical member 100. The reflection member 250 may include a reflective film or a reflective coating layer. The reflection member 250 reflects the light emitted to the lower surface 10b of the light guide plate 10 of the optical member 100 and enters the reflected light into the light guide plate 10 again.

The display panel 300 is disposed over the optical member 100. The display panel 300 receives light from the optical member 100 and displays a screen. Examples of the light-receiving display panel receiving light and display a screen may include a liquid crystal display panel and an electrophoretic panel. Hereinafter, a liquid crystal display panel will be exemplified as the display panel. However, the present invention is not limited thereto, and other various light-receiving display panels may be used.

The display panel 300 may include a first substrate 310, a second substrate 320 facing the first substrate 310, and a liquid crystal layer (not shown) disposed between the first substrate 310 and the second substrate 320. The first substrate 310 and the second substrate 320 overlap each other. In an embodiment, any one substrate may be larger than the other substrate, and may thus further protrude outward. FIG. 22 illustrates a case where the second substrate 320, which is disposed on the first substrate 310, is larger than the first substrate 310 and thus, protrudes from a side where the light source is disposed. The protruding region of the second substrate 320 may provide a space for mounting a driving chip or an external circuit board. Unlike the illustrated case, the first substrate 310, which is disposed beneath the second substrate 320, may be larger than the second substrate 320 and thus, may protrude outward. In the display panel 300, a region where the first substrate 310 and the second substrate 320 overlap each other, excluding the protruded region, may be substantially aligned with the side surface 10s of the light guide plate 10 of the optical member 100.

The optical member 100 may be coupled with the display panel 300 through an inter-module coupling member 610. The inter-module coupling member 610 may have a rectangular frame shape. The inter-module coupling member 610 may be disposed at the edges of the display panel 300 and the optical member 100, respectively.

In an exemplary embodiment, the lower surface of the inter-module coupling member 610 is disposed on the upper surface of the passivation layer 40 of the optical member 100. The inter-module coupling member 610 may be disposed such that its lower surface overlap only the upper surface 30a of the wavelength conversion layer 30 and does not overlap the side surface 30s of the wavelength conversion layer 30, on the passivation layer 40.

The inter-module coupling member 610 may include a polymer resin or an adhesive tape.

The inter-module coupling member 610 can further a light transmission blocking function. For example, the inter-module coupling member 610 may contain a light absorbing material such as a black pigment or dye, or may include a reflective material.

The display device 1000 may further include a housing 500. The housing 500 is open at one side, and includes a floor 510 and a side wall 520 connected to the floor 510. The light source 400, an assembly of the optical member 100 and the display panel 300, and the reflection member 250 may be accommodated in the space defined by the floor 510 and the side wall 520. The light source 400, the assembly of the optical member 100 and the display panel 300, and the reflection member 250 may be disposed on the floor 510 of the housing 500. The height of the side wall 520 of the housing 500 may be substantially the same as the height of the assembly of the optical member 100 and the display panel 300 provided in the housing 500. The display panel 300 is disposed adjacent to the upper end of the side wall of the housing 500, and they may be coupled to each other by a housing coupling member 620. The housing coupling member 620 may have a rectangular frame shape. The housing coupling member 620 may include a polymer resin or an adhesive tape.

The display device 1000 may further include at least one optical film 200. One optical film 200 or a plurality of optical films 200 may be accommodated in a space surrounded by the inter-module coupling member 610 between the optical member 100 and the display panel 300. The side surfaces of the optical film (200) may be in contact with the inner side surfaces of the inter-module coupling member (610) to be attached thereto. FIG. 22 illustrates a case where the optical film 200 and the optical member are spaced apart from each other, and the optical film and the display panel are spaced apart from each other, respectively, but the spaces therebetween are not necessarily required.

The optical film 200 may be a prism film, a diffusion film, a micro-lens film, a lenticular film, a polarizing film, a reflective polarizing film, a retardation film, or the like. The display device 1000 may include a plurality of optical films 200 of the same kind or different kinds. When the plurality of optical films 200 are applied, the optical films 200 may be disposed to overlap each other, and the side surfaces thereof may be in contact with the inner surfaces of the inter-module coupling member 610 to be attached thereto. The optical films 200 may be spaced apart from each other, and an air layer may be disposed between the optical films 200.

Hereinafter, a method of manufacturing a light guide plate including an optical pattern according to an exemplary embodiment will be described with reference to FIGS. 23 to 33.

Figure 23:
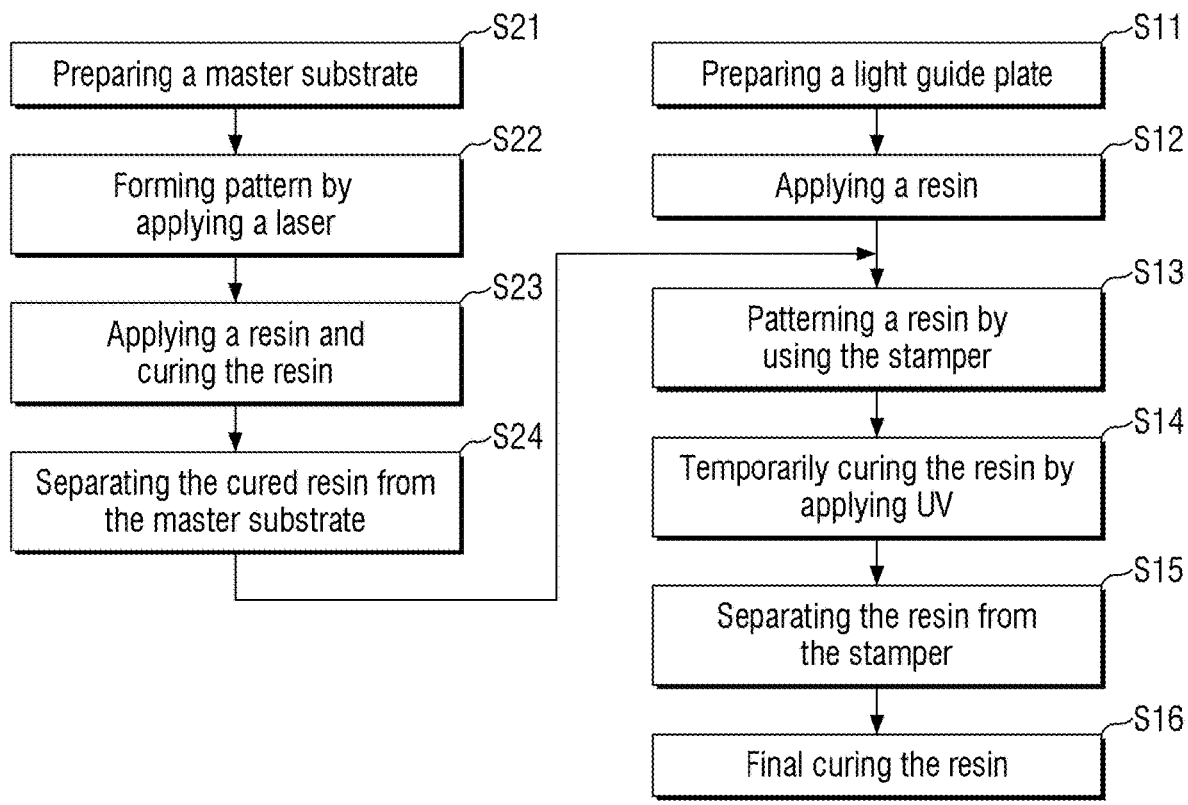
FIG. 23 is a flowchart illustrating a method of manufacturing an optical member according to an exemplary embodiment.

FIG. 23 is a flowchart illustrating a method of manufacturing an optical member according to an exemplary embodiment of the present invention.

Referring to FIG. 23, the method of manufacturing an optical member according to an exemplary embodiment of the present invention includes a process of forming an optical pattern on a light guide plate using a stamper. First, a method of manufacturing a stamper will be described.

Figure 24:
FIG. 24, FIG. 25, FIG. 26, FIG. 27, FIG. 28, FIG. 29, FIG. 30, FIG. 31, FIG. 32, and FIG. 33 are sectional views illustrating a method of manufacturing an optical member according to an exemplary embodiment.

Referring to FIGS. 23 and 24, a master substrate 1000 provided with a first master pattern 1010 having the same shape as the first pattern 71 is prepared (S21). The master substrate 1000 may be made of PMMA (polymethyl methacrylate), PC, PET, or the like. The first master pattern 1010 may have a shape of the master substrate 1000 itself. For example, a pattern may be formed simultaneously with the extrusion of a substrate using a pattern roll (not shown). The master substrate 1000 is a hexagonal column-shaped substrate having a rectangular planar shape, and the upper surface of the master substrate 100 may be continuously engraved with the first mater pattern 1010 having a lenticular shape in one direction.

Figure 25:
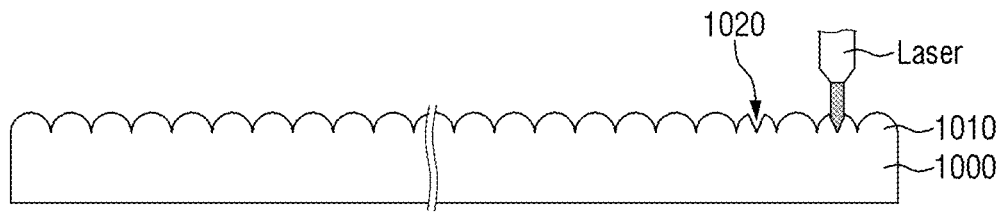

Subsequently, as shown in FIG. 25, a second master pattern 1020 is formed on the surface of the first master pattern 1010 of the master substrate 1000 (S22). The second master pattern 1020 may be formed by applying a laser. The laser may be applied according to a predetermined position. That is, the second master pattern 1020 may be predetermined to have the same arrangement as the second pattern 72. The width or depth of the second master pattern 1020 may be controlled by the wavelength, energy, irradiation time, irradiation angle, and the like of the laser. Here, the second master pattern 1020 is formed to have the same shape as the second pattern 72. That is, the second master pattern 1020 may have a conical shape whose bottom surface is elliptical as shown in FIGS. 8 and 9, or may have a truncated cone shape as shown in FIG. 12. The second master pattern 1020 may have a smooth surface, but is not limited thereto, and may have a non-smooth surface depending on the kind of the laser. Further, the second master pattern 1020 may be formed by applying the laser one time, but may also be formed by applying the laser several times according to the desired shape and depth.

As a result, the master substrate 1000 may be formed to have the same master patterns 1010 and 1020 as the optical pattern 70.

Figure 26:
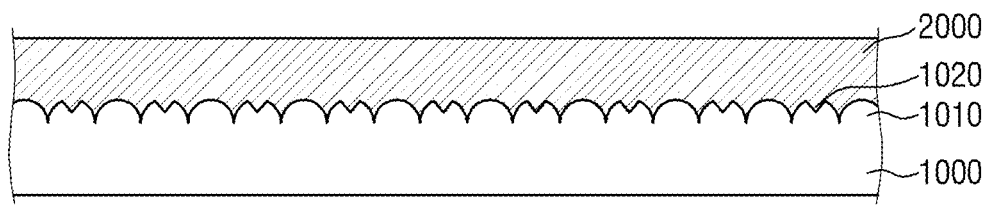
Figure 27:
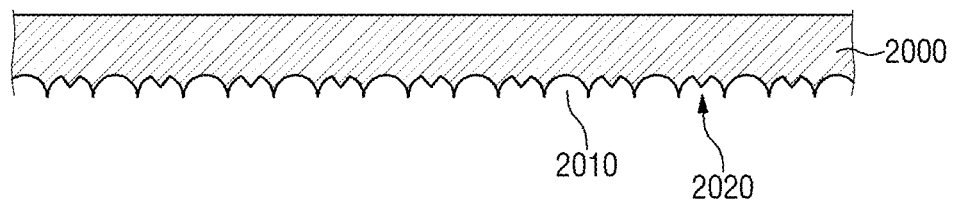

Subsequently, as shown in FIGS. 26 and 27, a resin is applied onto one surface of the master substrate 1000, and then cured to form a stamper 2000 (S23, S24). Here, one surface of the master substrate 1000 refers to a surface on which the first master pattern 1010 and the second master pattern 1020 are formed.

More specifically, a resin for a stamper is applied onto one surface of the master substrate 1000 using a slit nozzle. The resin for the stamper may be made of a transparent material through which ultraviolet rays can pass. Subsequently, the resin is cured by ultraviolet irradiation and/or heat irradiation, and then the cured resin is separated from the master substrate 1000 to complete the stamper 2000. The stamper 2000 is provided with patterns 2010 and 2020 having a shape opposite to that of the patterns 1010 and 1020 formed on the master substrate 1000. That is, an intaglio pattern 2010 having a semicircular cross section may continuously formed in a line shape in one direction, and an emboss pattern 2020 having a conical shape whose bottom surface is elliptical may be formed on the intaglio pattern 2010.

Next, a method of manufacturing an optical pattern using a stamper will be described with reference to FIGS. 23 and 28 to 30.

Figure 28:
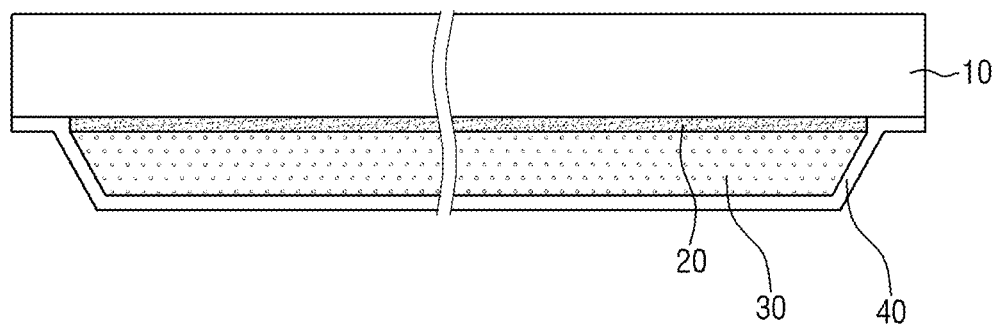

Referring to FIGS. 23 and 28, a light guide plate 10 having been subjected to a cleaning process is prepared (S11). In the drawings, the light guide plate 10 in which the low refractive index layer 20, the wavelength conversion layer 30, and the passivation layer 40 are integrated with each other on the upper surface thereof is exemplified, but the present invention is not limited thereto. That is, an optical pattern may formed on the light guide plate 10 by a method to be described later, and then the low refractive layer 20, the wavelength conversion layer 30, and the passivation layer 40 may be formed thereon.

Figure 29:
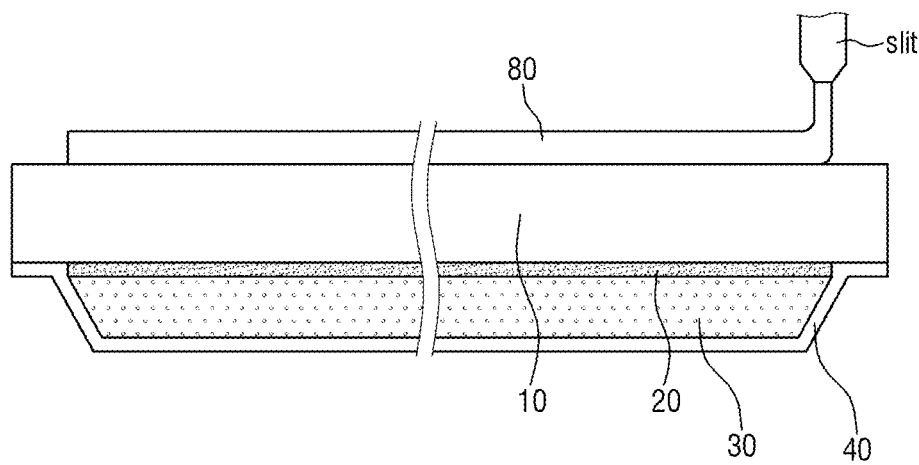

Referring to FIGS. 23 and 29, a resin 80 is applied to the lower surface 10*b* of the light guide plate 10 using a slit nozzle (S12). The resin 80 may be applied to a thickness of about 40 μm or less. Generally, when the resin 80 is UV-cured, the longer the time of exposure to ultraviolet rays, the greater the possibility of the resin 80 becoming yellowish. When the thickness of the resin 80 is 40 μm or less, the resin 80 can be effectively cured without yellowing of the resin 80. The lower limit of the thickness of the resin 80 is not limited, but it is preferable to apply the resin 80 to a thickness of 20 μm or more in consideration of the thickness of the optical pattern 70 to be formed later.

The resin 80 may be applied to a position spaced inward from the side surface 10*s* of the light guide plate 10 by a predetermined distance. That is, the resin 80 may be applied to the edge of the light guide plate 10 with a predetermined margin. Therefore, it is possible to prevent the resin 80 from overflowing the side surface 10*s* of the light guide plate 10 during imprinting.

The resin 80 may be composed of a material including a base resin, a UV initiator, and a binder. The base resin may be acrylate, urethane, urethane acrylate, silicone, epoxy or a combination thereof. However, the present invention is not limited thereto, and the base resin is not limited as long as it has a sufficient bonding force with the light guide plate 10.

Figure 30:
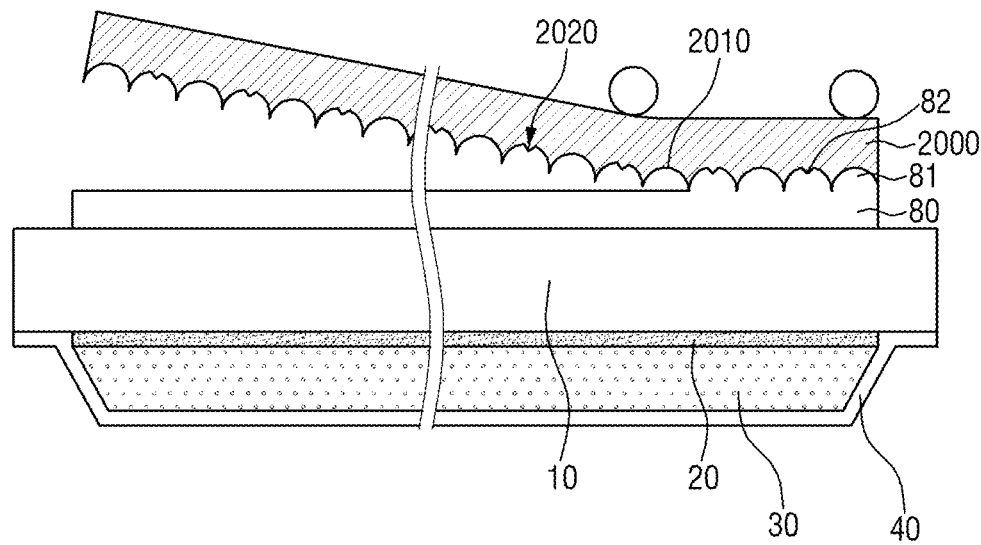

Referring to FIGS. 23 and 30, patterns 81 and 82 are formed on the resin 80 using the stamper 2000 having the emboss pattern 2010 and the intaglio pattern 2020 formed thereon (S13). That is, when the stamper 2000 presses the resin 80, the patterns 2010 and 2020 of the stamper 2000 are transferred to the resin 80, so that the optical patterns 81 and 82 opposite to the patterns 2010 and 2020 in shade are formed. For example, the first pattern 81, which is a lenticular pattern continuously formed in one direction, and the second pattern 82, which is a conical intaglio pattern, may be formed.

Figure 31:
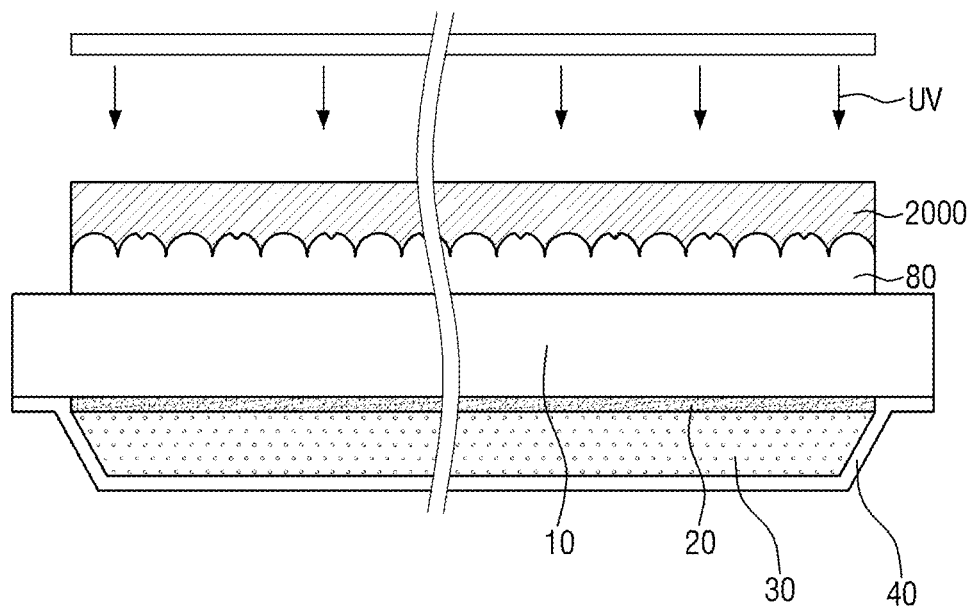

Next, as shown in FIGS. 23 and 31, ultraviolet rays (UV) are applied onto the stamper 2000 to temporarily cure the resin 80 (S14), and then the stamper 2000 is removed (S15). When the resin 80 is temporarily cured, the bonding force between resin particles, so as to prevent the resin particles from falling off at the time of detaching the stamper 2000 from the resin 80.

Figure 32:
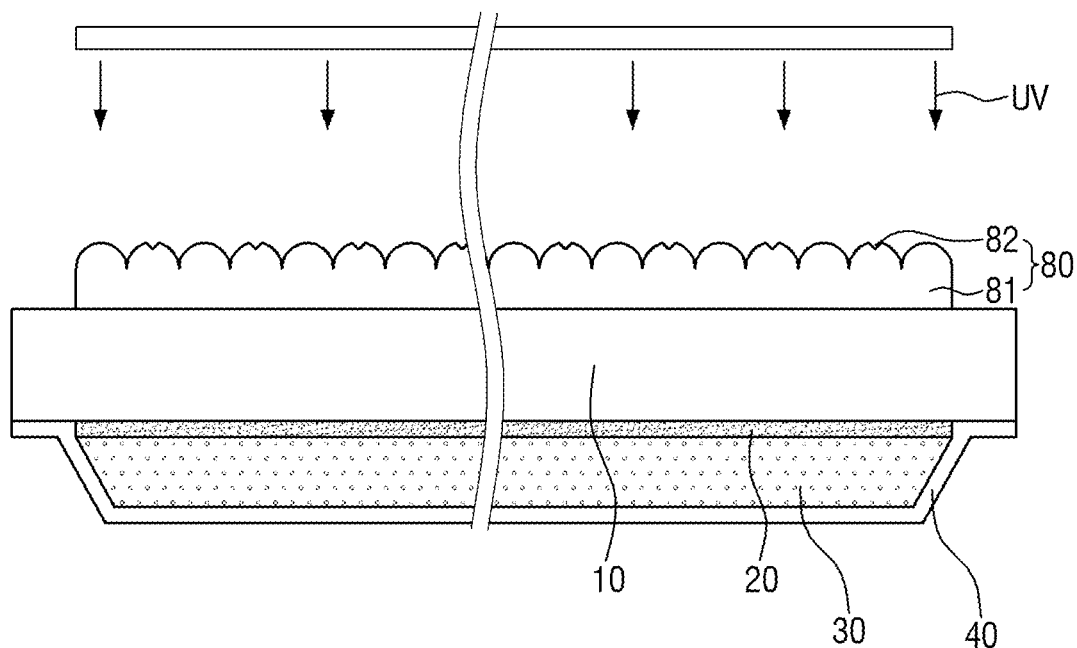
Figure 33:
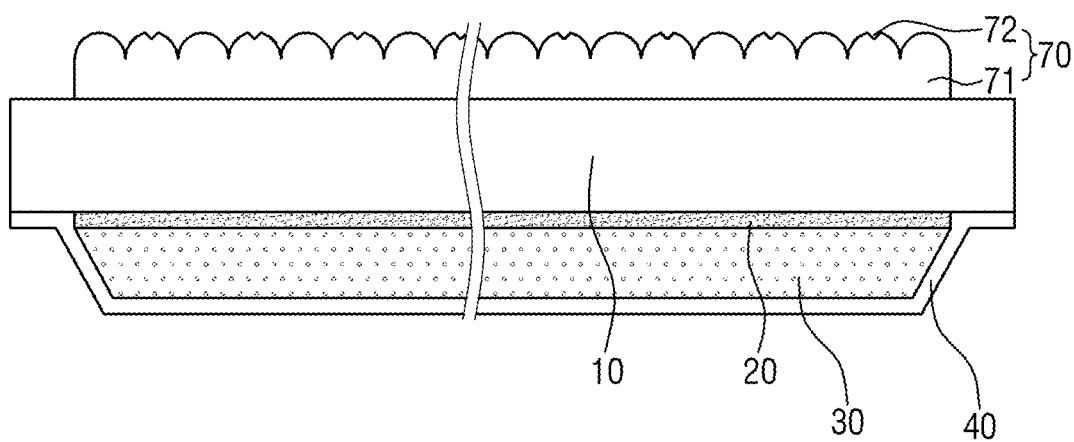
Figure 34:
FIG. 34, FIG. 35, FIG. 36, and FIG. 37 are sectional views illustrating a method of manufacturing an optical member according to another exemplary embodiment.

Subsequently, as shown in FIG. 32, the resin 80 is directly irradiated with ultraviolet rays (UV) to be subjected to final curing, thereby forming the optical pattern 70 (S16).

As described above, the first pattern 71 and second pattern 72 of the optical pattern 70 of the optical member 100 may be simultaneously formed by an imprinting method. That is, the first pattern 71 and the second pattern 72 are formed at the same time, thereby simplifying a process and reducing a cost.

The method of forming the optical pattern 70 has been exemplified as described above, but the present invention is not limited thereto.

As another example, the optical pattern 70 may be formed by forming a light guide plate 10 integrated with a first pattern 71 using a pressing method and forming a second pattern 72 on the surface of the first pattern 71 using a laser. That is, the light guide plate 10 integrated with the optical pattern 70 may be manufactured using the same method as the method of manufacturing the master substrate 1000 shown in FIG. 20.

Hereinafter, a method of manufacturing a light guide plate including an optical member according to another exemplary embodiment of the present invention will be described with reference to FIGS. 34 to 37. For the convenience of explanation, a description of the same method as that of the previously described exemplary embodiment will be omitted or simplified, and differences will be mainly described.

Figure 35:
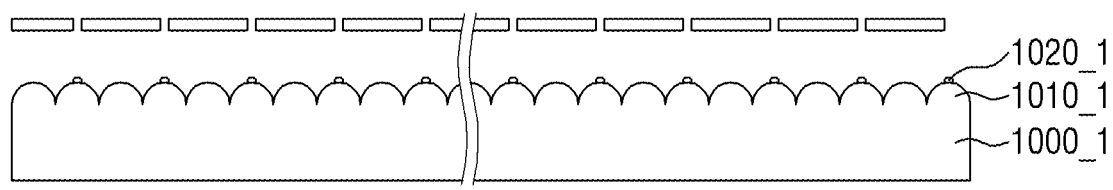
Figure 36:
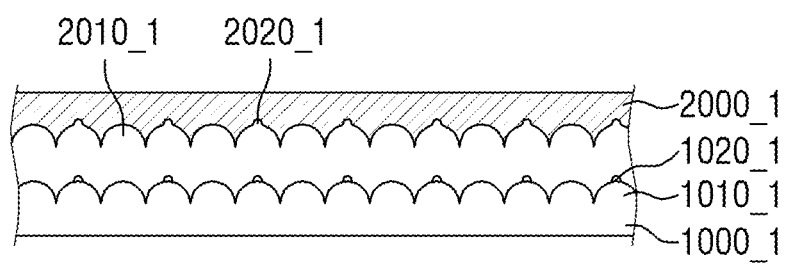
Figure 37:
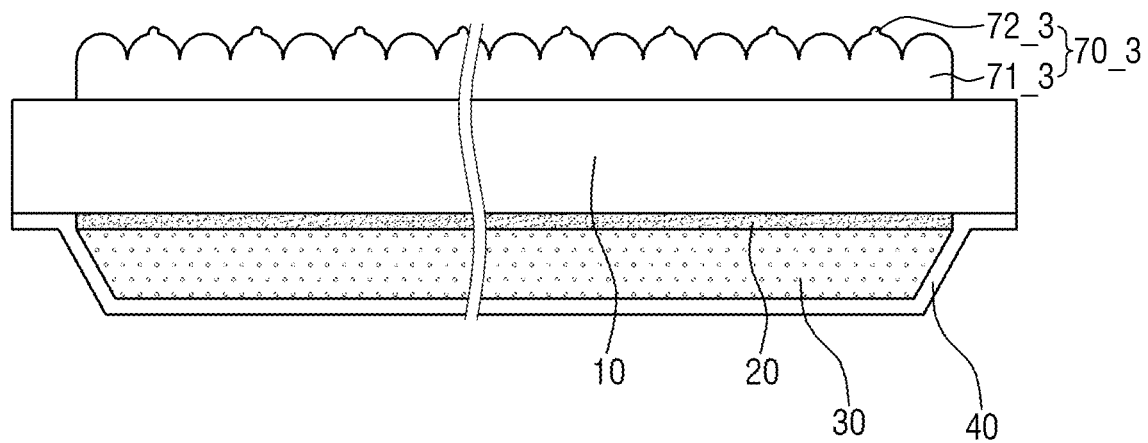

Referring to FIGS. 34 to 37, an optical pattern 70_3 in which the second pattern 72 is a convex pattern 72_3 protruding from the first pattern 71 may be formed using a lithography method. The method of forming the optical pattern 70_3 is generally the same as the aforementioned method of forming the optical pattern 70 in that a stamper 2000_1 is prepared using a master substrate 1000_1, and the lower surface 10*b* of the light guide plate 10 is imprinted using the stamper 2000_1 to form the optical pattern 70_3. However, the method of forming the optical pattern 70_3 is different from the aforementioned method of forming the optical pattern 70 in that a convex pattern 1020_1 is formed on a first master pattern 1010_1 using a lithography method as shown in FIG. 35 instead of the step (S22) of forming a groove in the master substrate using a laser. In this case, the stamper 2000_1 is provided thereon with an intaglio pattern 2010_1 opposite to the first master pattern 1010_1 in shade and an intaglio pattern 2020_1 opposite to the concave pattern 1020_1 formed by lithography in shade.

Subsequently, the stamper 2000_1 presses the resin applied on the lower surface 10*b* of the light guide plate, so as to form an optical pattern 70_3 including a first pattern 71_3 and a second pattern 72_3 opposite to the patterns 2010_1 and 2020_2 of the stamper 2000_1 in shade.

Even when forming the optical pattern 70_3 using a lithography method, the first pattern 71_3 and the second pattern 72_3 may be simultaneously formed by an imprinting method, thereby simplifying a process and reducing a cost.

As described above, according to the optical member according to an exemplary embodiment, a light guide function with excellent light straightness can be performed. Further, according to the optical member according to some exemplary embodiments, a wavelength conversion function can be performed as an integrated single member together with the light guide function, and the deterioration of the wavelength conversion layer can be prevented by the sealing structure. The integrated single member has a relatively small thickness, and can simplify an assembling process of the display device.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An optical member, comprising:
   a light guide plate;
   a low refractive layer disposed on an upper surface of the light guide plate and having a lower refractive index than the light guide plate;
   a wavelength conversion layer disposed on the low refractive layer;
   a passivation layer disposed on the wavelength conversion layer and covering a side surface of the wavelength conversion layer and a side surface of the low refractive layer; and
   an optical pattern formed on a lower surface of the light guide plate,
   wherein:
   a portion of the passivation layer directly contacts the upper surface of the light guide plate and does not overlap the low refractive layer in a direction perpendicular to the upper surface of the light guide plate; and
   the side surface of the wavelength conversion layer and a side surface of the passivation layer are inclined relative to the upper surface of the light guide plate.

2. The optical member of claim 1, wherein the optical pattern includes a first pattern having a line shape extending in one direction and a plurality of second patterns formed on the first pattern.

3. The optical member of claim 2, wherein the first pattern comprises a base portion and a pattern portion protruding from the base portion, and the plurality of second patterns is disposed on a surface of the first pattern and has an uneven shape.

4. The optical member of claim 3, wherein the uneven shape of the second pattern is a concave pattern shape recessed from the surface of the first pattern or a convex pattern shape protruding from the surface of the first pattern.

5. The optical member of claim 3, wherein each of the second patterns has a conical shape whose bottom surface is elliptical.

6. The optical member of claim 2, wherein the light guide plate includes a light incidence surface, and the first pattern extends in a direction perpendicular to the light incidence surface.

7. The optical member of claim 6, wherein the arrangement density of the plurality of second patterns increases as a distance from the light incidence surface increases.

8. The optical member of claim 2, wherein the first pattern has a lenticular shape.

9. The optical member of claim 2, wherein a side surface of the optical pattern is aligned with a side surface of the low refractive layer, or is located inward from the side surface of the low refractive layer.

10. The optical member of claim 2, wherein the first patterns are repeatedly disposed in parallel along a direction intersecting the one direction, and the second pattern has an uneven shape formed on a surface of the first pattern.

11. The optical member of claim 1, wherein the light guide plate and the passivation layer include an inorganic material.

12. The optical member of claim 1, wherein the low refractive layer has a refractive index of 1.2 to 1.4.

13. The optical member of claim 1, wherein the low refractive layer includes a void.

14. A display device, comprising:
    a light guide plate;
    a low refractive layer disposed on an upper surface of the light guide plate and having a lower refractive index than the light guide plate;
    a wavelength conversion layer disposed on the low refractive layer;
    a passivation layer disposed on the wavelength conversion layer and covering a side surface of the wavelength conversion layer and a side surface of the low refractive layer;
    an optical member including an optical pattern disposed on a lower surface of the light guide plate;
    a light source disposed at one or more sides of the light guide plate; and
    a display panel disposed over the optical member,
    wherein:
    a portion of the passivation layer is in direct contact with the upper surface of the light guide plate and does not overlap the low refractive layer in a direction perpendicular to the upper surface of the light guide plate; and
    the side surface of the wavelength conversion layer and a side surface of the passivation layer are inclined relative to the upper surface of the light guide plate.

15. The display device of claim 14, wherein the optical pattern comprises a first pattern having a line shape extending in one direction and a plurality of second patterns formed on the first pattern.

16. The display device of claim 15, wherein the first pattern comprises a base portion and a pattern portion protruding from the base portion, and each of the plurality of second patterns has a groove shape recessed from a surface of the first pattern or a convex shape protruding from the surface of the first pattern.

17. The optical member of claim 1, further comprising an auxiliary member disposed between the light guide plate and the optical pattern,
    wherein the auxiliary member directly contacts the light guide plate and the optical pattern.

* * * * *